United States Patent
Kini et al.

(10) Patent No.: US 9,516,118 B2
(45) Date of Patent: Dec. 6, 2016

(54) SCALABLE SEGMENT IDENTIFIER ALLOCATION IN SEGMENT ROUTING

(71) Applicant: Telefonaktiebolaget L M Ericsson (publ), Stockholm (SE)

(72) Inventors: Sriganesh Kini, Fremont, CA (US); Balazs Varga, Budapest (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 241 days.

(21) Appl. No.: 14/275,007

(22) Filed: May 12, 2014

(65) Prior Publication Data

US 2015/0326675 A1    Nov. 12, 2015

(51) Int. Cl.
| | |
|---|---|
| *G06F 15/173* | (2006.01) |
| *H04L 29/08* | (2006.01) |
| *H04L 12/26* | (2006.01) |
| *H04L 12/721* | (2013.01) |
| *H04L 12/723* | (2013.01) |
| *H04L 12/707* | (2013.01) |

(52) U.S. Cl.
CPC .............. *H04L 67/16* (2013.01); *H04L 43/10* (2013.01); *H04L 45/24* (2013.01); *H04L 45/38* (2013.01); *H04L 45/507* (2013.01)

(58) Field of Classification Search
CPC .................................. H04L 67/16; H04L 29/08
USPC .......................................................... 709/224
See application file for complete search history.

(56) References Cited

U.S. PATENT DOCUMENTS

| | | | |
|---|---|---|---|
| 7,577,143 B1 | 8/2009 | Kompella | |
| 7,644,061 B1 * | 1/2010 | Fallis | H04L 12/66 707/999.001 |
| 2007/0263634 A1 * | 11/2007 | Reeves | H04L 12/5601 370/395.2 |
| 2012/0307652 A1 * | 12/2012 | Vasseur | H04L 45/74 370/252 |

(Continued)

OTHER PUBLICATIONS

C. Filsfils et al., "Segment Routing Architecture, draft-filsfils-spring-segment-routing-00," Apr. 23, 2014, pp. 1-28, Network Working Group, Internet-Draft, 2014 IETF Trust and the persons identified as the document authors.

(Continued)

*Primary Examiner* — Nicholas Taylor
*Assistant Examiner* — Meng Vang
(74) *Attorney, Agent, or Firm* — Nicholson de Vos Webster & Elliott LLP

(57) ABSTRACT

Exemplary methods for allocating multiple local sub-blocks (LsBs) of segment identifiers (IDs) include allocating a first set of LsBs, each LsB associated with a start index and a range, wherein the start index indicates a starting SID of a corresponding LsB and the range indicates a total number of SIDs included in the corresponding LsB, each LsB identified by a sub-block number. In one embodiment, the methods include mapping a plurality of segment routing global block (SRGB) indexes to a plurality of corresponding SIDs of the first set of LsBs, the mapping performed based on the SRGB indexes, start indexes of each LsB, and ranges of SIDs of each LsB. In one embodiment, the methods include advertising the first set of LsBs by transmitting a first advertisement message that includes the start indexes, ranges of SIDs, and sub-block numbers of all LsBs of the first set of LsBs.

24 Claims, 14 Drawing Sheets

(56) References Cited

U.S. PATENT DOCUMENTS

| | | | |
|---|---|---|---|
| 2014/0098675 A1* | 4/2014 | Frost | H04L 69/166 370/241.1 |
| 2014/0169370 A1* | 6/2014 | Filsfils | H04L 69/166 370/392 |
| 2014/0254596 A1* | 9/2014 | Filsfils | H04L 45/745 370/392 |

OTHER PUBLICATIONS

C. Filsfils et al., "Segment Routing with MPLS data plane, draft-filsfils-spring-segment-routing-mpls-00," Oct. 20, 2013, pp. 1-11, Network Working Group, Internet-Draft, 2013 IETF Trust and the persons identified as the document authors.

K. Kompella et al., "Layer 2 Virtual Private Networks Using BGP for Auto-discovery and Signaling, draft-kompella-l2vpn-12vpn-10.txt," Feb. 27, 2012, pp. 1-31, Network Working Group, Internet-Draft, 2012 IETF Trust and the persons identified as the document authors.

S. Previdi et al., "IS-IS Extensions for Segment Routing, draft-ietf-isis-segment-routing-extensions-00," Apr. 11, 2014, pp. 1-30, IS-IS for IP Internets, Internet-Draft, 2014 IETF Trust and the persons identified as the document authors.

E. Rosen et al., "Multiprotocol Label Switching Architecture," Jan. 2001, pp. 1-61, Network Working Group, Request for Comments: 3031, The Internet Society.

"White Paper, Technology Overview, Virtual Private LAN Service Architectures and Operation," Feb. 9, 2004, pp. 1-30, Cisco Systems, Inc.

Bradner, S., "Key Words for use in RFCs to Indicate Requirement Levels", *Request for Comments: 2119, IETF*, (Mar. 1997), 3 pages.

Filsfils, et al., "Segment Routing Architecture", *draft-filsfils-rtgwg-segment-routing-01, Network Working Group, Internet-Draft, Internet Engineering Task Force (IETF)*, (Oct. 21, 2013), 28 pages.

Filsfils, et al., "Segment Routing Use Cases", *draft-filsfils-rtgwg-segment-routing-use-cases-02, Network Working Group, Internet-Draft, Internet Engineering Task Force (IETF)*, (Oct. 21, 2013), 36 pages.

Gredler, et al., "Supporting Source/Explicitly Routed Tunnels via Stacked LSPs", *draft-gredler-spring-mpls-02, Network Working Group, Internet Draft, Internet Engineering Task Force (IETF)*, (Oct. 21 2013), 17 pages.

Previdi, et al., "IS-IS Extensions for Segment Routing", *draft-previdi-isis-segment-routing-extensions-05, IS-IS for IP Internets, Internet-Draft, Internet Engineering Task Force (IETF)*, (Feb. 13, 2014), 27 pages.

Psenak, et al., "OSPF Extensions for Segment Routing", *draft-psenak-ospf-segment-routing-extensions-04, Open Shortest Path First IGP, Internet-Draft, Internet Engineering Task Force (IETF)*, (Feb. 13, 2014), 29 pages.

* cited by examiner

```
// Mapping logic to map SRGB index to SID/Label
// j = SRGB index
//  ml = mapped label for j sub_blcok_num = cur_index = 0;

While (cur_index + LsB[sub_block_num].range < j) {
        cur_index += LsB[sub_block_num].rage;
        sub_block_num ++;
} index_within_LsB = j – cur_index;

ml = LsB[sub_block_num].start_index + index_within_LsB
```

FIG. 2

Decreasing SRGB Range  FIG. 5

SCALABLE SEGMENT IDENTIFIER ALLOCATION IN SEGMENT ROUTING

FIELD

Embodiments of the invention relate to the field of packet networks; and more specifically, to allocation and maintenance of segment identifiers in segment routing.

BACKGROUND

Segment Routing (SR) is a packet forwarding technology based on source routing. A variety of use-cases for SR have been described in I-D.filsfils-rtgwg-segment-routing-use-cases, which is hereby incorporated by reference. An abstract routing model for SR is described in I-D.filsfils-rtgwg-segment-routing, which is hereby incorporated by reference. Reference I-D.filsfils-rtgwg-segment-routing describes the instantiation of SR using Internet Protocol version 6 (IPv6) or Multiprotocol Label Switching (MPLS). The IPv6 instantiation is proposed using extensions with a new identifier (ID) space for segment identifiers (SIDs). The MPLS instantiation, however, is intended to co-exist with the label space used by dynamic MPLS label distribution protocols such as Label Distribution Protocol (LDP) and RSVP-TE. The architecture for the SR-MPLS is further described in I-D.gredler-spring-mpls, which is hereby incorporated by reference.

SR-MPLS uses MPLS labels as SIDs and they are allocated from a global block, herein referred to as Segment Routing Global Block (SRGB). The allocation of SIDs from the SRGB is described in I-D.filsfils-rtgwg-segment-routing, which is hereby incorporated by reference. I-D.psenak-ospf-segment-routing-extensions proposes that the advertisement of the labels as SIDs is performed using an Interior Gateway Protocol (IGP) such as Open Shortest Path First (OSPF). I-D.previdi-isis-segment-routing-extensions proposes that the advertisement of the labels as SIDs is performed using an Intermediate System to Intermediate System (IS-IS) protocol. I-D.psenak-ospf-segment-routing-extensions and I-D.previdi-isis-segment-routing-extensions are both hereby incorporated by reference. As described by these references, each label switch router (LSR) can independently advertise the label block that it is using for segment routing. I-D.psenak-ospf-segment-routing-extensions discloses that SID Range sub-TLV MUST appear only once and hence only a single block can be advertised for SR. I-D.previdi-isis-segment-routing-extensions discloses that SR-Capabilities sub-TLV MAY occur multiple times. I-D.previdi-isis-segment-routing-extensions fails to disclose, however, how multiple occurrences should be interpreted by the receiving LSR other than disclosing that only the Flags in the first occurrence of the SR-Capabilities sub-TLV are to be taken into account. Thus, there is no method currently available to scale the number of labels beyond the range of the first block. Further, there is no method currently available to dynamically allocate multiple blocks, increase, decrease, or coalesce multiple blocks.

SUMMARY

Exemplary methods for allocating multiple LsBs of SIDs at a first network device that is communicatively coupled to a plurality of segment routing devices in a SR network are herein described. According to one aspect of the invention, the exemplary methods include allocating a first set of local sub-blocks (LsBs) of SIDs, each LsB associated with a start index and a range of SIDs, wherein the start index indicates a starting SID of a corresponding LsB and the range of SIDs indicates a total number of SIDs included in the corresponding LsB, wherein each LsB is identified by a sub-block number. In one embodiment, the methods further include mapping a plurality of segment routing global block (SRGB) indexes to a plurality of corresponding SIDs of the first set of LsBs, wherein the mapping is performed based on the SRGB indexes, start indexes of each LsB, and ranges of SIDs of each LsB. The methods include advertising the first set of LsBs to the plurality of SR devices by transmitting a first advertisement message that includes the start indexes, ranges of SIDs, and sub-block numbers of all LsBs of the first set of LsBs.

In one embodiment, mapping the plurality of indexes of the SRGB to the plurality of corresponding SIDs of the first set of LsBs comprises determining a range of SIDs of a first LsB is less than an SRGB index, determining a combined range of SIDs of the first LsB and a second LsB by adding a range of SIDs of the first LsB and a range of SIDs of the second LsB. In one embodiment, the methods include in response to determining the combined range of SIDs of the first LsB and the second LsB is greater than the SRGB index, determining a difference by subtracting the range of the first LsB from the SRGB index, determining a sum by adding the difference to a start index of the second LsB, and mapping the SRGB index to the sum.

According to one aspect of the invention, the exemplary methods further include in response to determining a range of indexes of the SRGB exceeds a combined range of SIDs of all LsBs of the first set of LsBs, allocating a new LsB, and advertising a second set of LsBs by transmitting a second advertisement message that includes start indexes, ranges of SIDs, and sub-block numbers of all LsBs of the first set of LsBs and the new LsB.

According to one aspect of the invention, the exemplary methods include in response to determining a combined range of SIDs of all LsBs of the first set of LsBs exceeds a desired reduced SRGB range, decreasing the combined range of SIDs of the first set of LsBs by de-allocating an SID of an LsB having a highest sub-block number among all the LsBs of the first set of LsBs by determining a prefix is associated with a current SID which exceeds the desired reduced SRGB range, advertising a new SID for the prefix by transmitting a second advertisement message that includes the new SID and a no-ingress flag set to a Boolean true value, wherein the no-ingress flag with the Boolean true value causes one or more of the plurality of SR devices to set up an entry in an incoming label map (ILM) table for the new SID, without setting up an entry in a forwarding equivalence class (FEC) to next hop (FTN) table for the new SID.

In one embodiment, in response to determining a combined range of SIDs of all LsBs of the first set of LsBs exceeds a desired reduced SRGB range, the exemplary methods further include advertising the new SID for the prefix by transmitting a third advertisement message that includes the new SID and a no-ingress flag set to a Boolean false value, wherein the no-ingress flag with the Boolean false value causes one or more of the plurality of SR devices to set up an entry in the FTN table corresponding to the new SID, and advertising the current SID by transmitting a fourth advertisement message that includes the current SID and a no-ingress flag set to a Boolean true value, wherein the no-ingress flag with the Boolean true value causes one or more of the plurality of SR devices to remove an entry from the FTN table corresponding to the current SID, and de-allocating the current SID.

In one aspect of the invention, the exemplary methods include decreasing a number of LsBs of the first set of LsBs by merging a source LsB of the first set of LsBs with a target LsB of the first set of LsBs, by advertising a shift LsB (SLsB) by transmitting a second advertisement message that includes a start index of the SLsB, a start index of the source LsB, a start index of the target LsB, a range of SIDs of the SLsB, a range of SIDs of the source LsB, a range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

In one embodiment, decreasing the number of LsBs of the first set of LsBs further comprises advertising a shift SID for a prefix by transmitting a third advertisement message that includes the shift SID and a do-not-use flag set to a Boolean true value, wherein the shift SID is an SID within a range of SIDs of the SLsB, wherein the do-not-use flag with the Boolean true value causes one or more of the plurality of SR devices to set up an entry in an incoming label map (ILM) table for the shift SID, without setting up an entry in a forwarding equivalence class (FEC) to next hop (FTN) table for the shift SID, and advertising the shift SID for the prefix by transmitting a fourth advertisement message that includes the shift SID and a do-not-use flag set to a Boolean false value, wherein the do-not-use flag with the Boolean false value causes one or more of the plurality of SR devices to set up an entry in the FTN table for the shift SID.

In one embodiment, decreasing the number of LsBs of the first set of LsBs further comprises advertising a source SID for the prefix by transmitting a fifth advertisement message that includes the source SID and a do-not-use flag set to a Boolean true value, wherein the source SID is an SID within a range of the source LsB, wherein the do-not-use flag with the Boolean true value causes one or more of the plurality of SR devices to remove an entry in the FTN table associated with the source SID, and advertising the SLsB by transmitting a sixth advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean true value, wherein the use-range flag with the Boolean true value causes one or more of the plurality of SR devices to perform SRGB index to SID mapping using the start index and range of SIDs of the shift LsB.

In one embodiment, decreasing the number of LsBs of the first set of LsBs further comprises advertising the SLsB by transmitting a seventh advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

BRIEF DESCRIPTION OF THE DRAWINGS

Embodiments of the invention are illustrated by way of example and not limitation in the figures of the accompanying drawings in which like references indicate similar elements.

FIG. 2 is a pseudo code for performing index to SID mapping according to one embodiment.

DESCRIPTION OF EMBODIMENTS

Figure 1:
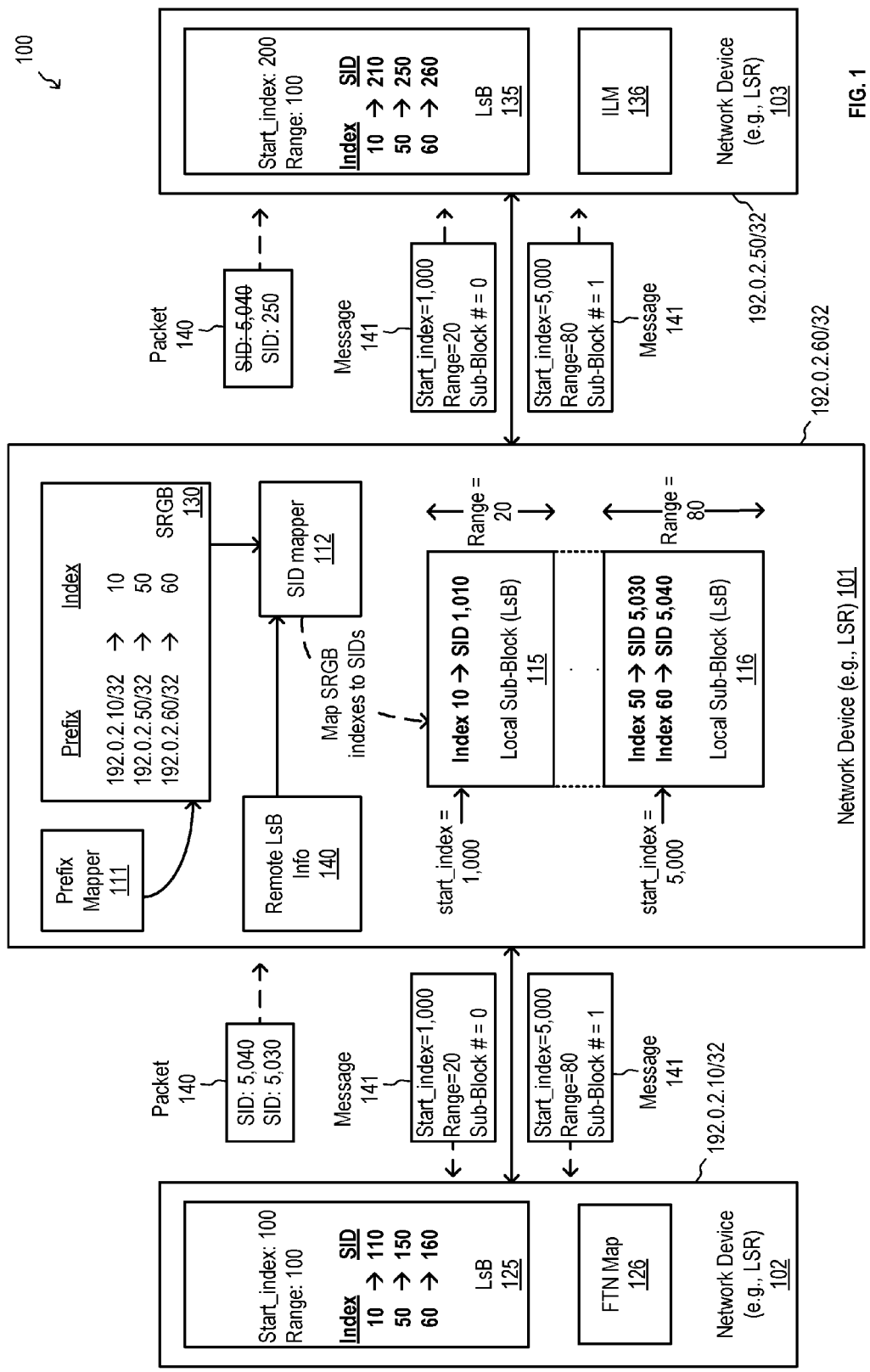
FIG. 1 is a block diagram illustrating a network for supporting SR routing according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/pas sword accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP)) that communicate with other network devices to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network device can store one or more bridging tables that are used to forward data based on the layer 2 information in that data.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (or pathing—also known as multipath forwarding or IP multipath) (ECMP) may be used and typical implementations use as the criteria particular header fields to ensure that the packets of a particular packet flow are always forwarded on the same next hop to preserve packet flow ordering. For purposes of multipath forwarding, a packet flow is defined as a set of packets that share an ordering constraint. As an example, the set of packet in a particular TCP transfer sequence need to arrive in order, else the TCP logic will interpret out of order delivery as congestion and slow the TCP transfer rate down.

FIG. 1 is a block diagram illustrating SR network 100 according to one embodiment. SR leverages the source routing paradigm. In SR, a node (e.g., a SR capable network device) steers a packet through the network by utilizing a set of instructions, herein referred to as segments or SIDs. The segments are included as part of an SR header which has been prepended onto the packet at the ingress. A segment can represent any topological or service instruction. SR architecture can be applied to the MPLS data plane with no change in the forwarding plane. SR, when applied to MPLS data plane, provides the ability to tunnel services (e.g., Virtual Private Network (VPN), Virtual Private Local LAN Service (VPLS), Virtual Private Wire Service (VPWS)) from an ingress LSR to an egress LSR, without any other protocol other than IS-IS or OSPF. LDP and RSVP-TE signaling protocols are not required.

Network 100 includes, but is not limited to, network devices (e.g., LSRs) 101-103. Throughout the description, network devices 101-103 may be interchangeably referred to as LSRs. In the illustrated example, network devices 101-103 are attached with the prefixes 192.0.2.60/32, 192.0.2.10/32, and 192.0.2.50/32, respectively. In one embodiment, network device 101 includes prefix mapper 111 responsible for mapping prefixes to SRGB indexes. Prefix mapper 111 is responsible for mapping/associating prefixes with SRGB indexes (herein referred to simply as indexes), and advertising this mapping to other network devices in network 100 using mechanisms well known in the art. In this example, SRGB 130 includes indexes 10, 50, and 60. More or less indexes, however, can be included as part of SRGB 130. For the purpose of illustration, and not limitation, prefixes 192.0.2.10/32, 192.0.2.50/32, and 192.0.2.60/32 are associated with (i.e., mapped to) indexes 10, 50, and 60, respectively. In one embodiment, network devices 102-103 include prefix mappers and SRGBs similar to prefix mapper 111 and SRGB 130, respectively. Details of prefix mappers and SRGBs of network devices 102-103 have been omitted, however, from FIG. 1 in order to avoid obscuring the invention.

Conventionally, an SR device can only allocate a single block of SIDs, wherein the SIDs are mapped the indexes. When SR is instantiated using MPLS, it would have to co-exist with Label Distribution Protocol (LDP) and Resource Reservation Protocol-Traffic Engineering (RSVP-TE) signaled MPLS networks for a significant period of time, potentially indefinitely depending on how the market evolves. Most deployments of SR-MPLS are expected to start small in existing LDP and RSVP-TE MPLS networks and then expand therefrom. As the networks grow, the restriction of a single block of SIDs at each SR device can become a severe limitation. Embodiments of the present invention overcome this limitation by providing techniques for an SR device to allocate multiple blocks of SIDs, herein referred to as local sub-blocks (LsBs) of SIDs.

According to one embodiment, network device 101 includes SID mapper 112 responsible for allocating multiple LsBs, in this example, LsBs 115-116. More LsBs, however, can be allocated without departing from the broader scope and spirit of the present invention. Each LsB is identified by a sub-block number. In one embodiment, a first LsB is identified by a sub-block number of 0, and the sub-block numbers increase sequentially for each subsequent LsB. Other conventions can be used, however, to identify the LsBs. In this example, it is assumed that LsB 115 is the first LsB with a sub-block number of 0, and LsB 116 is a second LsB with a sub-block number of 1. In one embodiment, each LsB is associated with (i.e., characterized/defined) by a start index and a range of SIDs (herein referred to simply as range). The start index indicates the starting SID of a corresponding LsB, and the range indicates the number of SIDs in the corresponding LsB. In the illustrated example, LsB 115 has a start index of 1,000 and a range of 20. Thus, LsB 115 includes a range of SIDs from 1,000 to 1,019. As illustrated, LsB 116 has a start index of 5,000 and a range of 80. Thus, LsB 115 includes a range of SIDs from 5,000 to 5,079.

In one embodiment, SID mapper 112 is responsible for mapping indexes to the SIDs of LsBs 115-116. FIG. 2 illustrates pseudo code 200 for mapping indexes to the SIDs, according to one embodiment. Pseudo code 200 can be implemented as software, firmware, hardware, or any combination thereof. Referring now back to FIG. 1. Using logic similar to pseudo code 200, SID mapper 112 performs index to SID mapping by determining that, based on the start index (i.e., 1,000) and range (i.e., 20) of LsB 115, SIDs 1,000-1,019 map to indexes 0-19. Further, based on the start index (i.e., 5,000) and range (i.e., 80) of LsB 116, SID mapper 112 determines that SIDs 5,000-5,080 map to indexes 20-99. Thus, from the perspective of network device 101, prefixes 192.0.2.10/32, 192.0.2.50/32, and 192.0.2.60/32 are mapped to SIDs 1,010, 5,030, and 5,040, respectively. Throughout the description, references are made to the SRGB range. Here, the SRGB range refers to the range of indexes of the SRGB. It shall be understood that the SRGB range is the same as the combined range of all LsBs of a particular SR device. For example, the combined range of LsBs 115-116 shall equal the range of SRGB 130.

Network devices 102-103 include mapping logic similar to those described above. For example, network device 102 includes mapping logic that maps indexes 0-99 to SIDs 100-199 because LsB 125 of network device 102 is associated with a start index of 100 and a range of 100. Thus, from the perspective of network device 102, prefixes 192.0.2.10/32, 192.0.2.50/32, and 192.0.2.60/32 are mapped to SIDs 110, 150, and 160, respectively. Similarly, network device 103 includes mapping logic that maps indexes 0-99 to SIDs 200-299 because LsB 135 of network device 103 is associated with a start index of 200 and a range of 100. Thus, from the perspective of network device 103, prefixes 192.0.2.10/32, 192.0.2.50/32, and 192.0.2.60/32 are mapped to SIDs 210, 250, and 260, respectively. Details of mapping logic of network devices 102-103 have been omitted, however, from FIG. 1 in order to avoid obscuring the invention.

In one embodiment, SID mapper 112 is responsible for advertising LsBs 115-116 to other network devices in the network, for example, by transmitting message 141. Message 141 includes information identifying LsBs 115-116, including, but not limited to, the start index, range, and sub-block number of each LsB. It shall be understood that message 141 may be one or more messages transmitted by network device 141.

Figure 3:
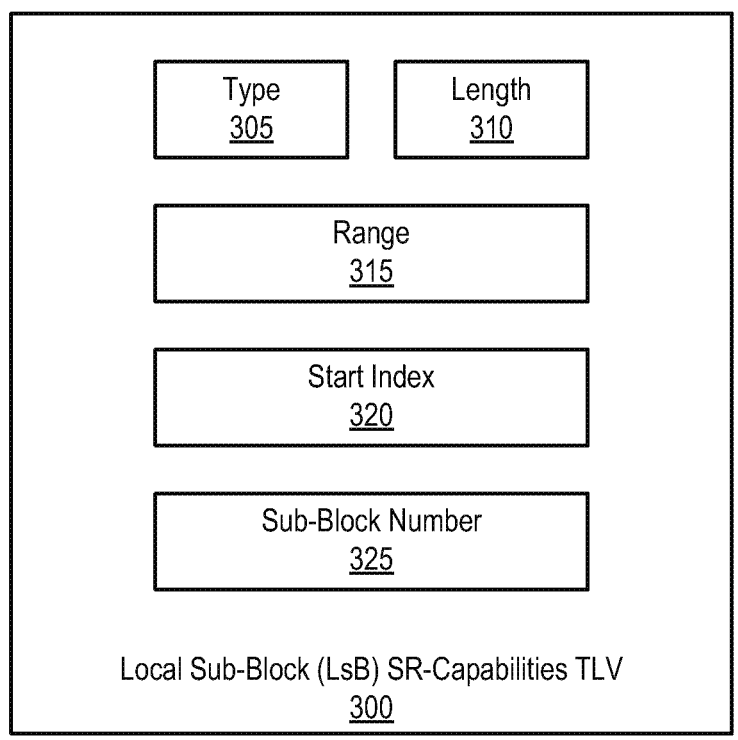
FIG. 3 is a block diagram illustrating a LsB SR-Capabilities TLV according to one embodiment.

FIG. 3 is a block diagram illustrating LsB SR-Capabilities type length value (TLV) 300 according to one embodiment. In one embodiment, LsB SR-Capabilities TLV 300 is used for advertising the LsBs. One LsB SR-Capabilities TLV 300, for example, can be included as part of message 141 for each LsB. In one embodiment, LsB SR-Capabilities TLV 300 includes type field 305, length field 310, range field 315, start index field 320, and sub-block number field 325. Other fields can be included, however, as part of LsB SR-Capabilities TLV 300. Type field 305 contains a predefined encoding that identifies LsB SR-Capabilities TLV 300. Length field 310 includes a value indicating the length of LsB SR-Capabilities TLV 300. In one embodiment, range field 315 includes a value that indicates the range of SIDs of the LsB identified by the value included in sub-block number field 325. Start index field 320 contains a value indicating the starting SID of the LsB identified by the value included in sub-block number field 325.

Referring now back to FIG. 1. In this example, message 141 can include 2 LsB SR-Capabilities TLVs for advertising LsBs 115-116. For example, one LsB SR-Capabilities TLV can include the start index, range, and sub-block number of LsB 115, while the other LsB SR-Capabilities TLV can include the start index, range, and sub-block number of LsB 116. It shall be understood that network devices 102-103 include similar logic for advertising LsBs 125 and 135, respectively.

According to one embodiment, network device 101 includes remote LsB info 140 for storing mapping information of remote LsBs advertised by remote SR devices, such as, for example, network devices 102-103. As used herein, "remote LsBs" refers to LsBs that are allocated/maintained by remote network devices. In one embodiment, remote LsB info 140 can include, but not limited to, the start indexes, ranges, sub-block numbers of remote LsBs (e.g., LsBs 125 and 135). The information can be obtained using various mechanisms. For example, the information can be transmitted by remote SR devices and received by network device 101. Alternatively, or in addition to, the information concerning the remote LsBs can be configured by a user (e.g., an operator) via an application programming interface (API). In this example, remote LsB info 140 includes information indicating that network device 102 has allocated LsB 125 with a start index and range of 100 and 100, respectively. Remote LsB info 140 can further include information indicating that network device 103 has allocated LsB 135 with a start index and range of 200 and 100, respectively. In one embodiment, network device 101 utilizes remote LsB info 140 to perform SID swapping when an incoming packet is forwarded to the next hop (described by way of example below). Although not illustrated, it shall be understood that network devices 102-103 include similar mechanisms for storing information of remote LsBs.

In one embodiment, network device 102 includes forwarding equivalence class (FEC) to next hop (FTN) map 126, which may be implemented as part of a FIB. At the ingress of an SR-MPLS network, packets entering the SR-MPLS domain are assigned to an FEC. An FEC identifies a set of packets with similar characteristics (e.g., destination IP address) which may be forwarded the same way. In one embodiment, FTN map 126 maps incoming packets based on the FEC to a corresponding Next Hop Label Forwarding Entry (NHLFE). An NHLFE is an entry that contains the next hop information (e.g., interface and next-hop address) and label manipulation instructions. An NHLFE entry may also contain label encoding, L2 encapsulation information, and other information required for processing packets in the associated stream. The FEC-to-NHLFE relationship defines how ingress LSRs (e.g., network device 102) imposes SIDs (in SR) or labels (in MPLS) onto incoming packets. Thus, a NHLFE defines the SIDs/labels that are pushed onto an incoming packet as it gets forwarded to the SR-MPLS domain. Without such an NHLFE entry, an incoming packet will not enter the SR-MPLS domain. The FEC-to-NHLFE relationship also defines how egress routers (e.g., network device 101 and/or 103) will decapsulate the MPLS shim header from the MPLS packets. A FTN map, such as FTN map 126, is typically implemented as part of an ingress LSR. Although FTN map 126 is shown as part of network device 102, it shall be understood that FTN map 126 can be implemented as part of one or more other network devices in the network.

In one embodiment, network device 103 includes incoming label map (ILM) 136, which may be implemented as part of a FIB. ILM 136 maps SIDs/labels of incoming packets to corresponding NHLFEs. The incoming SID/label-to-NHLFE relationship defines how core/transit LSRs forward incoming packets. Typically, ILMs are used at core/transit LSRs (as opposed to ingress/egress LSRs). Although ILM 136 is shown as part of network device 103, it shall be understood that ILM 136 can be implemented as part of one or more other network devices in the network.

Packet routing in an SR network will now be described for illustrative purposes, and not intended to be limitations of the present invention. In this example, it is assumed that network device 102 is an ingress LSR, network device 101 is a transit/core LSR, and network device 103 is an egress LSR. The example assumes that packet 140 arrives at ingress LSR 102 and exits at egress LSR 103. It is further assumed that the LsBs have been advertised by LSRs 101-103, and thus, each LSR is able to swap incoming SIDs with an appropriate outgoing SIDs when the packet is forwarded.

At the entrance of an SR domain, the ingress LSR determines the path for an incoming packet based on the NHLFE entries that have been setup in its local FTN map. In this example, packet 140 arrives at ingress LSR 102. Ingress LSR 102 utilizes FTP map 126 to determine that packet 140 is to travel to transit LSR 101, and finally to egress LSR 102. In an SR network, the ingress LSR pushes/ prepends the SR header on top of the packet based on the determined path of the packet. The SR header contains an ordered list of SIDs. In this example, ingress LSR 102 pushes an SR header on top of packet 140. The SR header, in this example, includes SID 5,040 and SID 5,030. Ingress LSR 102 determines that the first SID on the list is 5,040 because transit LSR 101 is attached with prefix 192.0.2.60, which is mapped to index 60. Index 60 is mapped to SID 5,040 based on start indexes and ranges of LsBs 115-116 allocated at transit LSR 101. Similarly, ingress LSR 102 determines that the second SID on the list is 5,030 because transit LSR 103 is attached with prefix 192.0.2.50, which is mapped to index 50. Index 50 is mapped to SID 5,030 based on start indexes and ranges of LsBs 115-116 allocated at transit LSR 101. In other words, ingress LSR 102 performs the SID mapping as required by the next hop (in this example, transit LSR 101). Index to SID mapping is described in details above.

When packet 140 arrives at transit LSR 101, SID 5,040 is popped from the SR header. Transit LSR 101 re-maps (i.e., swaps) SID 5,030 included in the SR header to an SID required by the next hop (in this example, egress LSR 103). In other words, transit LSR 101 re-maps the SID included in the SR header based on the start index and range of LsB 135 allocated at egress LSR 103. For example, transit LSR 101 determines that SID 5,030 is mapped to index 50, and that index 50 is mapped to SID 250 based the start index and range of LsB 135. Thus, transit LSR 102 forwards packet 140 with SID 250.

When packet 140 finally arrives at egress LSR 103, SID 250 is popped from the SR header. Egress 103 determines that SID 250 is the last SID in the list, and removes the SR header from packet 140. After the SR header is removed, packet 140 is processed by egress LSR 103 or an attached client (not shown). The packet routing example described above is intended for illustrative purposes. One having ordinary skill in the art would recognize that the SID mapping technique of the present invention applies equally to other network configurations that require the SR header to include different ordered lists of SIDs.

In one embodiment, in response to determining the number of SIDs to be allocated exceed the combined range of LsBs currently allocated, SID mapper 112 is configured to allocate new LsBs. In one embodiment, the number and size of new LsBs allocated by each LSR can be different. The combined ranges of all LsBs, however, are the same at all LSRs. The number and size of LsBs that are allocated for SR at each LSR depends on the unallocated SIDs, or rather unallocated blocks of SIDs at the respective SR device at that time. The unallocated blocks of SIDs, in turn, depend on the labels that are allocated at that time by other dynamic label distribution protocols such as LDP and RSVP-TE running at the SR device. It is recommended that the least number of new LsBs be allocated at each LSR.

In some instances, it is desirable (or perhaps required) that the SRGB range be decreased, thus the number of allocated SIDs be decreased. In one embodiment, to decrease the number of allocated SIDs, SID mapper 112 de-allocates the highest indexed LsBs. Here, the "highest indexed LsB" refers to the allocated LsB with the highest sub-block number. Alternatively, or in addition to, SID mapper 112 may also trim/decrease the range of the highest LsB in order to reach the desired SRGB range. The de-allocated SIDs can be then utilized by dynamic label distribution protocols such as LDP and RSVP-TE.

Decreasing the SRGB range is of course possible only when the number of prefixes for which SIDs have been advertised are reduced. In other words, SIDs cannot be de-allocated if they are currently associated with active (i.e., in-use) prefixes. For example, it is possible that some prefixes are advertised with SIDs in the higher indexes in the range. In such a scenario, those prefixes should first be re-mapped to lower indexes in the range, and then the range can be reduced. The re-mapping of such indexes to lower indexes should be performed in a hitless manner (i.e., such that traffic associated with the prefix is not disturbed).

Figure 4:
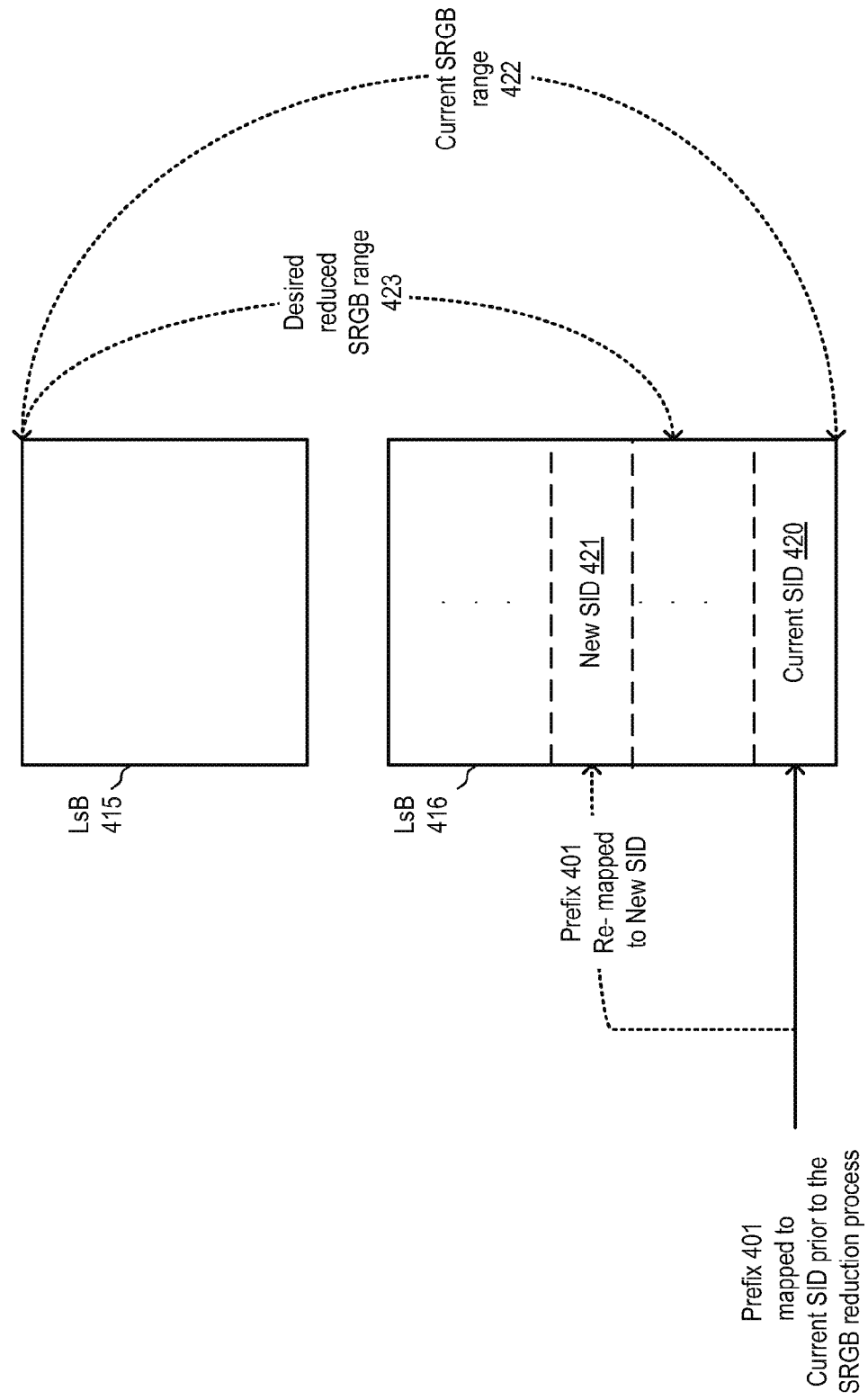
FIG. 4 is a block diagram illustrating an example of SRGB range reduction according to one embodiment.

FIG. 4 is a block diagram illustrating an example of decreasing the SRGB range. In this example, the combined range of LsBs 415 and 416 equals current SRGB range 422. It has been determined, however, that reduced SRGB range 423 is desirable. In this example, desired reduced SRGB range 423 only includes a portion of LsB 416, and in particular, desired reduced SRGB range 423 does not include current SID 420. Thus, in order to reduce the SRGB range, at least current SID 420 should be de-allocated. Current SID 420, however, is currently mapped to prefix 401. Thus, in order to decrease the SRGB range in a hitless manner (i.e., such that traffic associated with current SID 420 will not be affected), prefix 401 must first be mapped to new SID 421 which is an unallocated SID that is within desired reduced SRGB range 423.

Figure 5:
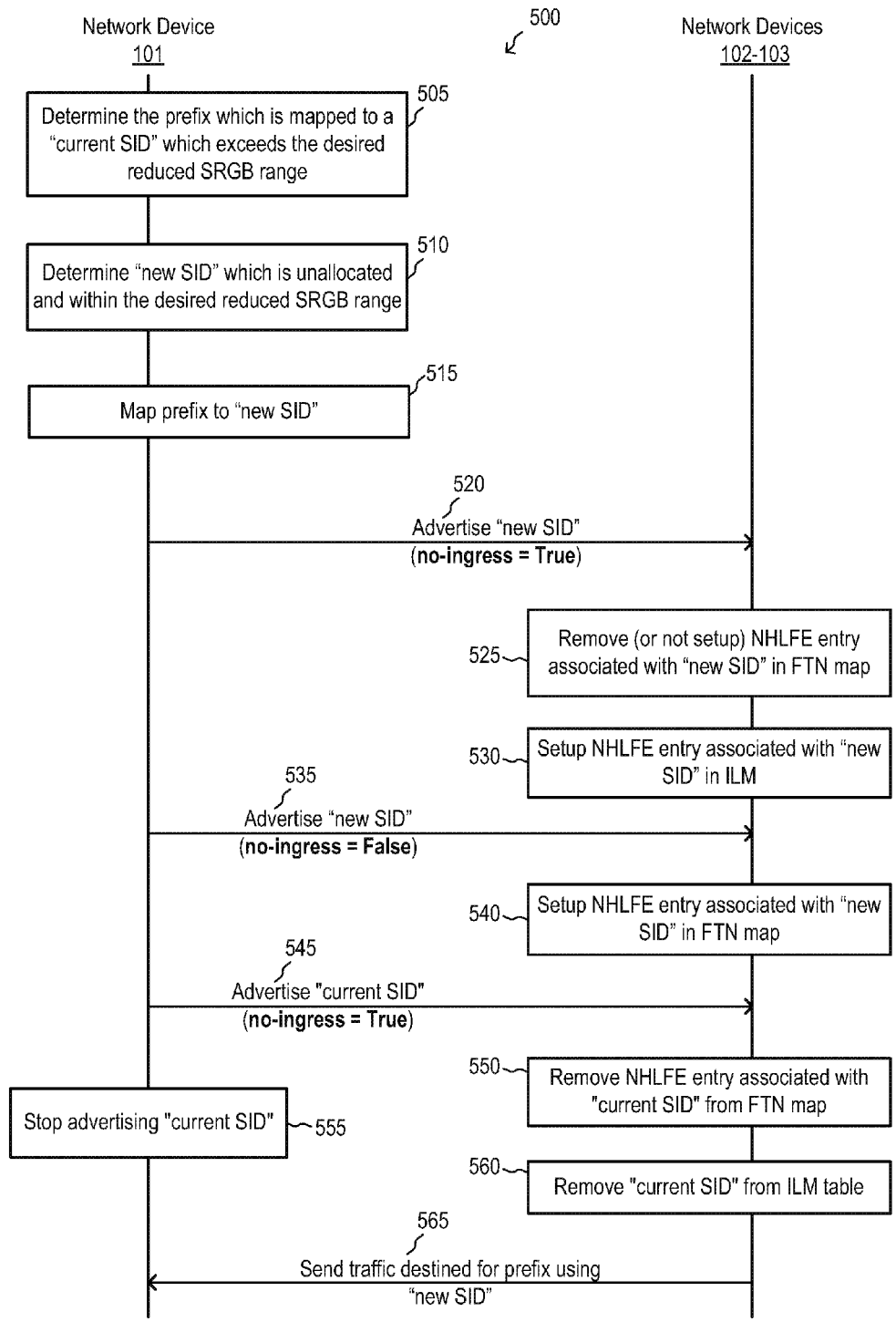
FIG. 5 is a flow diagram illustrating a process flow for reducing the SRGB range according to one embodiment.

FIG. 5 is a flow diagram illustrating process flow 500 for decreasing the SRGB range in a hitless manner according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams. Process flow 500 will now be described with reference to the example illustrated in FIG. 4.

At operation 505, network device 101 determines the prefix which is mapped to a "current SID" which exceeds the desired reduced SRGB range. For example, network device 101 determines that prefix 401 is mapped to current SID 420, which exceeds desired reduced SRGB range 423. At operation 510, network device 101 determines a "new SID" which is unallocated and within the desired reduced SRGB range. For example, network device 101 determines new SID 421, which is unallocated and within desired reduced SRGB range 423. At operation 515, network device 101 maps the prefix to the "new SID". For example, network device maps prefix 401 to new SID 421.

Figure 6:
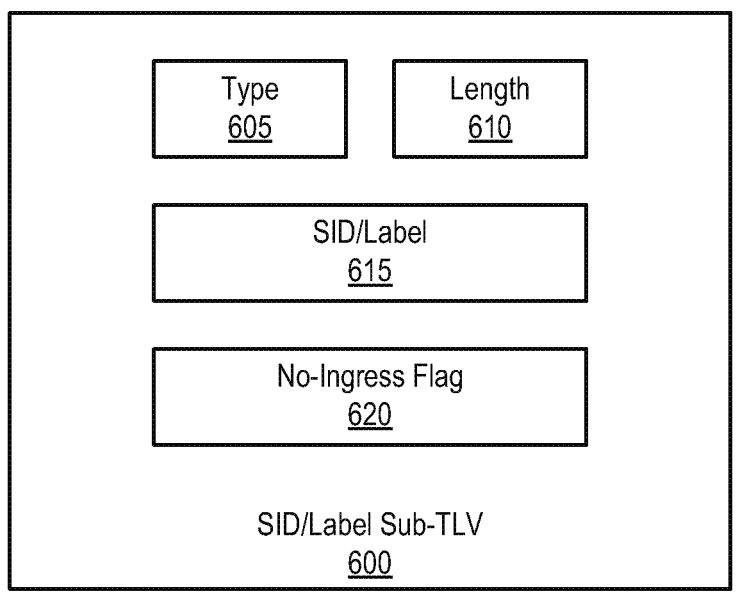
FIG. 6 is a block diagram illustrating a SID/Label Sub-TLV according to one embodiment.

At operation 520, network device 101 sends an advertisement message to network devices 102-103 advertising the "new SID" for the prefix. In one embodiment, the advertisement message includes an SID/Label Sub-TLV such as the SID/Label Sub-TLV illustrated in FIG. 6. FIG. 6 is a block diagram illustrating SID/Label Sub-TLV 600 according to one embodiment. In the illustrated embodiment, SID/Label Sub-TLV 600 includes type field 605, length field 610, SID/Label field 615, and no-ingress flag field 620. Other fields can be included, however, as part of SID/Label Sub-TLV 600. Type field 605 contains a predefined encoding that identifies SID/Label Sub-TLV 600. Length field 610 includes a value indicating the length of SID/Label Sub-TLV 600. In one embodiment, SID/Label field 615 includes the SID being advertised. For example, SID/Label field 615 contains the "new SID" when transmitted as part of operation 520.

No-ingress flag field 620 contains a Boolean value. For example, no-ingress flag field 620 can include a Boolean True value (herein simply referred to as a "true no-ingress flag") or a Boolean False value (herein simply referred to as a "false no-ingress flag"). In one embodiment, when SID/Label Sub-TLV 600 includes a true no-ingress flag, SID/Label Sub-TLV 600 causes core/transit LSRs to setup their routing tables such that packets corresponding to the advertised SID (i.e., the SID contained in SID/Label 615) can be routed/forwarded to the next hop. For example, a true no-ingress flag may cause the transit LSRs to setup a NHLFE entry for the advertised SID in their ILM maps. In one embodiment, when SID/Label Sub-TLV 600 includes a true no-ingress flag, SID/Label Sub-TLV 600 causes ingress LSRs to not setup their routing tables in order to prevent packets corresponding to the advertised SID from being forwarded to the SR domain. For example, a true no-ingress flag may cause the ingress LSR to not setup a NHLFE entry for the advertised SID in the FTN map. In one embodiment, if an NHLFE entry for the advertised SID already exists in the FTP map, a true no-ingress flag causes the ingress LSR to remove the existing NHLFE entry in order to prevent packets associated with the advertised SID from being introduced into the SR domain.

In one embodiment, when SID/Label Sub-TLV 600 includes a false no-ingress flag, SID/Label Sub-TLV 600 causes ingress LSRs to setup their routing tables in order to allow packets corresponding to the advertised SID to be introduced (i.e., forwarded) into the SR domain. For example, a false no-ingress flag may cause the ingress LSR to setup a NHLFE entry for the advertised SID in the FTN map to allow packets associated with the advertised SID to be introduced into the SR domain.

Referring now back to FIG. 5, at operation 520, the advertisement sent by network device 101 includes a true no-ingress flag. At operation 525, in response to the true no-ingress flag of operation 520, network device 102 does not setup its routing table in order to prevent packets associated with the advertised "new SID" from being introduced into the SR network. For example, network device 102 does not setup a NHLFE entry corresponding to the advertised "new SID" in FTP map 126. In one embodiment, if the NHLFE entry corresponding to the advertised "new SID" already exists in FTN map 126, network device 102 removes the existing NHLFE entry. In this way, packets associated with the "new SID" will not be forwarded to the SR domain.

At operation 530, in response to the true no-ingress flag of operation 520, network device 103 sets up its routing table in order to forward packets associated with the advertised "new SID" to the next hop. For example, network device 103 sets up a NHLFE entry corresponding to the advertised "new SID" in ILM 136. In this way, packets associated with the "new SID" will be forwarded to the next hop in the SR domain. Note that by setting up the routing tables of the transit LSRs before setting up the routing tables of ingress LSR, network device 101 ensures that once packets associated with the "new SID" are introduced into the SR domain, they will be forwarded appropriately, in a hitless manner.

In one embodiment, network device 101 waits for a predetermined duration of time after transmitting the advertisement of operation 520. For example, network device 101 waits for a duration of time in order to allow network devices 102-103 sufficient time to update their routing tables (e.g., perform operations 525 and 530, respectively). At operation 535, after waiting for the predetermined duration of time, network device 101 re-advertises the "new SID", but this time with a false no-ingress flag. For example, network device 101 sends an advertisement message to network devices 102-103 that includes SID/Label Sub-TLV 600 with SID/Label field 615 containing the "new SID", and no-ingress flag field 620 containing a Boolean False value.

At operation 540, in response to the false no-ingress flag of operation 535, the ingress router sets up its routing table such that packets associated with the "new SID" can be introduced to the SR domain (e.g., forwarded to the next hop in the SR domain). For example, in response to the false no-ingress flag of operation 535, network device 102 sets up a NHLFE entry corresponding to the "new SID" in FTN map 126. In this way, packets associated with the "new SID" can be forwarded to the SR domain (i.e., forwarded to the next hop). Again, as described above the transit LSRs have been previously setup to route these packets, and thus the re-mapping of the prefix to the "new SID" is performed in a hitless manner.

In one embodiment, network device 101 waits for another predetermined duration of time after transmitting the advertisement of operation 535. For example, network device 101 waits for a duration of time in order to allow network device 102 sufficient time to update its routing table (e.g., perform operation 540). At operation 545, after waiting for the predetermined duration of time, network device 101 sends an advertisement message to network devices 102-103 advertising the "current SID" that was allocated to the prefix prior to the SRGB range reduction process. For example, network device 101 advertises current SID 420 which was allocated to prefix 401 prior to the SRGB range reduction process. In one embodiment, the advertisement message includes an SID/Label Sub-TLV such as SID/Label Sub-TLV 600. For example, when transmitted as part of operation 545, SID/Label field 615 contains the "current SID", and no-ingress flag field 620 contains a Boolean True value.

At operation 550, in response to the true no-ingress flag of operation 545, network device 102 updates its routing table in order to prevent packets associated with the advertised "current SID" from being introduced into the SR network. For example, if the NHLFE entry corresponding to the advertised "current SID" exists in FTN map 126, network device 102 removes the existing NHLFE entry. In this way, packets associated with the "current SID" will not be forwarded to SR domain.

At operation 555, network device 101 stops advertising the "current SID". At operation 560, in response to not receiving advertisements for the "current SID", the transit LSRs update their routing tables such that routing information associated with the "current SID" are removed. For example, network device 103 removes all NHLFE entries associated with the "current SID" from ILM 136. At operation 565, LSRs of the SR domain send traffic destined for prefix 401 using the "new SID".

In some instances, it is desirable (or perhaps required) to coalesce/compact the number of allocated LsBs. Here, "coalescing/compacting LsBs" refers to the merging of two or more LsBs in order to reduce/decrease the number of allocated LsBs. In one embodiment, a source LsB may be split in order to merge a portion of it with the target LsB. Here, the "source LsB" refers to the LsB which is being merged, and the "target LsB" refers to the LsB which the source LsB is being merged to. Thus, after the coalescing/compaction process, only the target LsB remains. Splitting the source LsB may be necessary, for example, if merging the entire source LsB requires more resources than currently available.

In one embodiment, SID mapper 112 merges portions of the source LsB with the target LsB by using a temporary LsB (herein referred to as a shift-LsB (SLsB)). In one embodiment, SID mapper 112 can advertise only a single SLsB at any given time. A SLsB is uniquely identified as such when advertised and it does not have a sub-block number. The start index associated with the SLsB is advertised such that the SLsB is contiguous to the target LsB, and the range of the SLsB is equal to (or less than) the space currently available. In one embodiment, the advertised SLsB includes information concerning the source and target LsBs, including, for example, but not limited to, the start indexes, ranges, and sub-block numbers of the source and target LsBs prior to the coalescing process. In one embodiment, the advertised SLsB further includes a use-range flag that indicates whether the start index and range information associated with the SLsB should be utilized for performing SID mapping, instead of those associated with the source and target LsBs.

In some instances, a prefix may be currently mapped to an SID within the range of the source LsB (herein referred to as the "source SID"). After the compaction process, such a prefix will be re-mapped to a new SID. Throughout the description, such a prefix shall be referred to as an "affected prefix". The compaction process must be performed in a hitless manner (i.e., traffic associated with the affected prefix will not be disturbed). In one embodiment, in order to perform LsB compaction in a hitless manner, the affected prefix is advertised with two SIDs. That is, along with the usual (i.e., "source") SID, an additional SID (herein referred to as a shift-SID) is advertised for the affected prefix. The shift-SID is an index into the SLsB. In one embodiment, a do-not-use flag is advertised along with the Shift-SID for the affected prefix. In one embodiment, when the do-not-use flag is set to Boolean True, then all the receiving LSRs set their incoming label maps for the Shift-SID, but do not use the Shift-SID as a next-hop label forwarding entry.

Figure 7C:
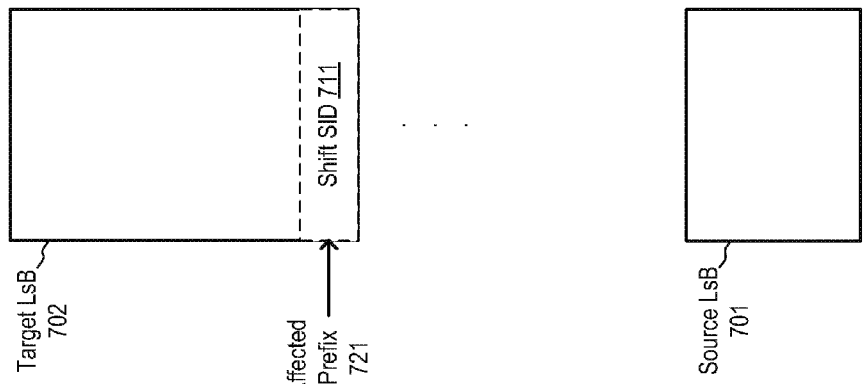
FIGS. 7A-7C are block diagrams illustrating an example of LsB compaction.
Figure 7B:
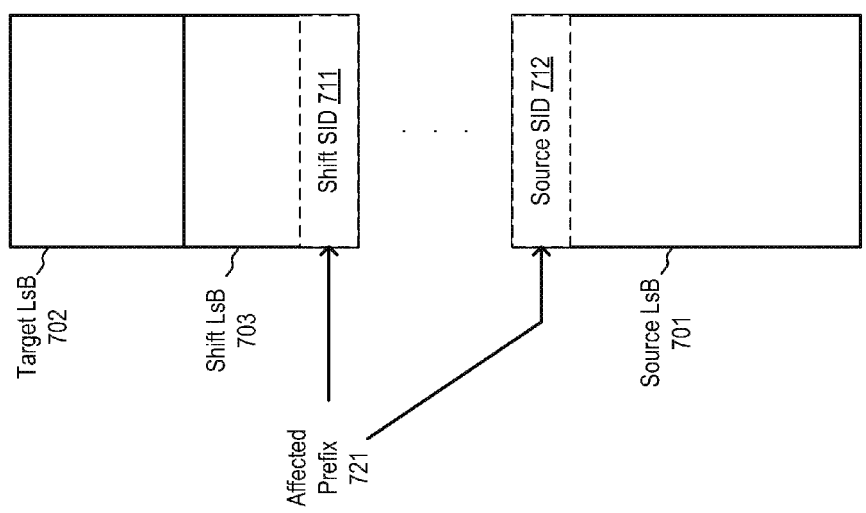
Figure 7A:
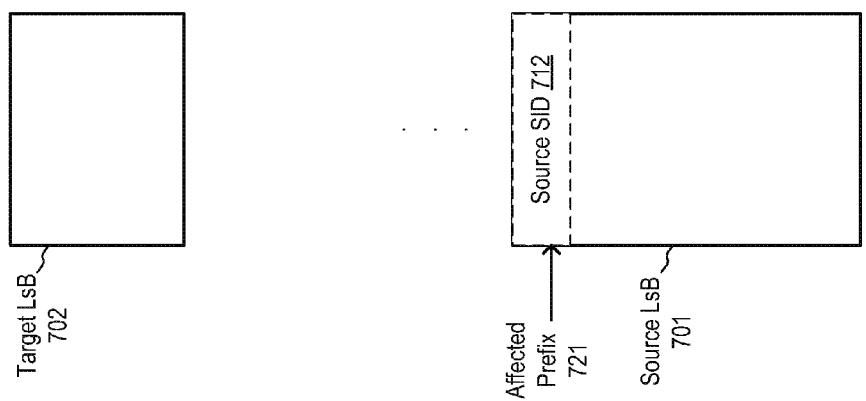

FIGS. 7A-7C are block diagrams illustrating an example of LsB compaction. FIG. 7A illustrates that source LsB 701 is to be merged with target LsB 702, and that affected prefix 721 is currently advertised with source SID 712. FIG. 7B illustrates that shift LsB 703 has been allocated and advertised in order to perform LsB compaction in a hitless manner. As illustrated in FIG. 7B, affected prefix 721 is now advertised with both source SID 712 and shift-SID 711. FIG. 7C illustrates that a portion of source LsB 701 has been merged with target LsB 702, and that affected prefix 721 is now advertised with only the new SID (i.e., shift-SID 711). Thus, as a result of the compaction process, traffic associated with affected prefix 721 will be mapped to the new SID.

Figure 8:
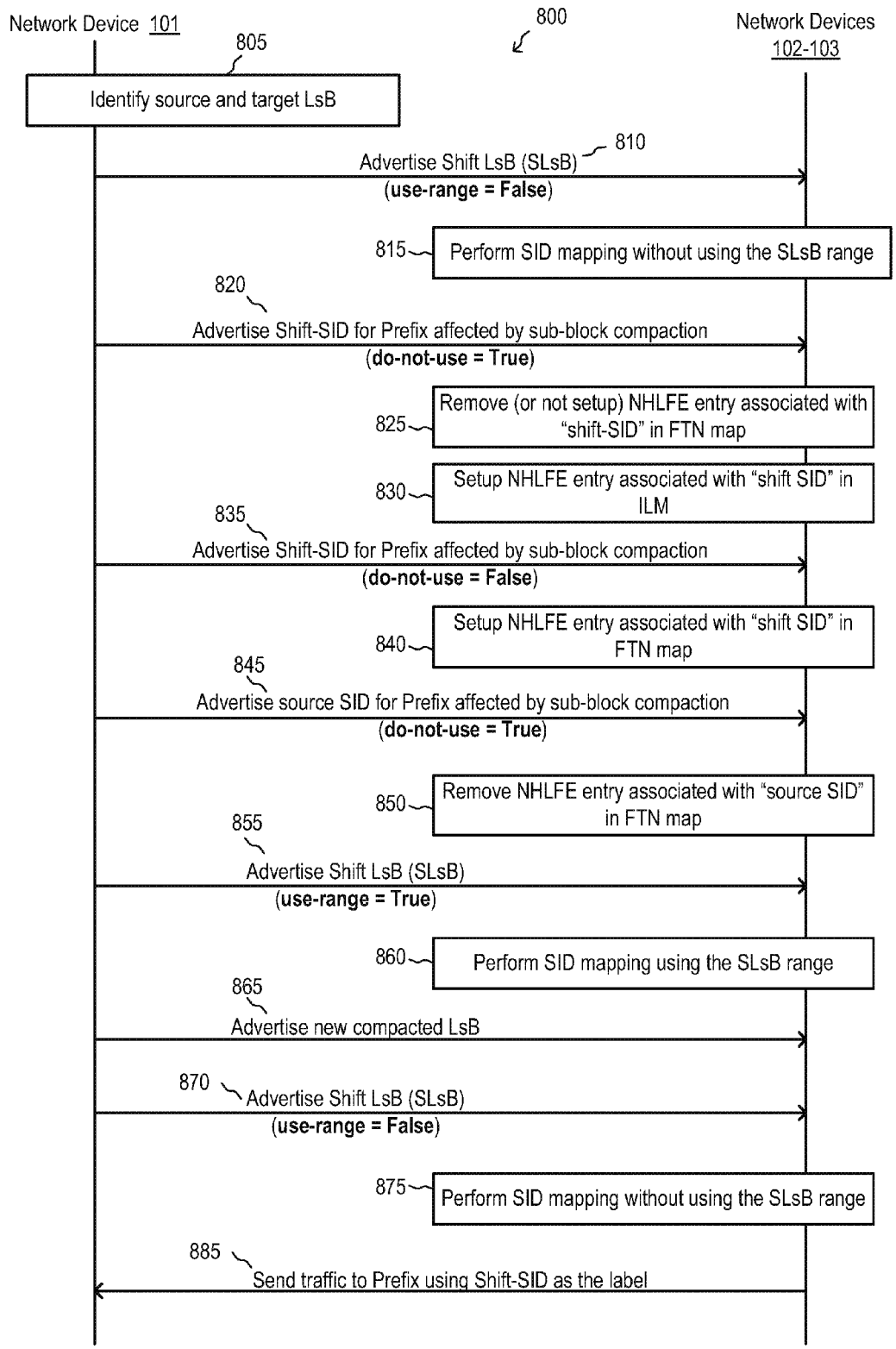
FIG. 8 is a flow diagram illustrating a process flow for compacting/coalescing LsBs according to one embodiment.

FIG. 8 is a flow diagram illustrating process flow 800 for performing LsB compaction in a hitless manner, according to one embodiment. The operations of the process flow 800 shall be described with reference to the example illustrated in FIGS. 7A-7C. Referring now to FIG. 8, at operation 805, network device 101 identifies the source and target LsBs to be merged. For example, network device 101 identifies source LsB 701 and target LsB 702.

Figure 9:
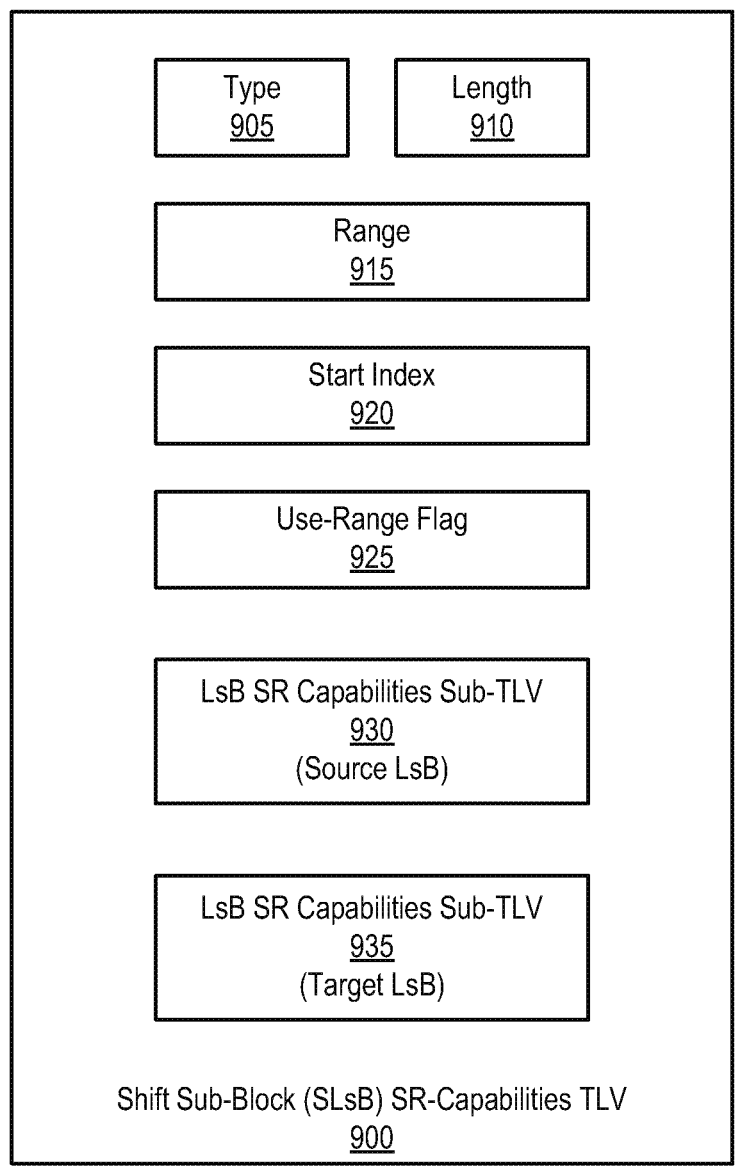
FIG. 9 is a block diagram illustrating a SLsB SR-Capabilities TLV according to one embodiment.

At operation 810, network device 101 sends an advertisement message to network devices 102-103 advertising the shift LsB (SLsB). For example, network device 101 sends an advertisement to advertise SLsB 703. In one embodiment, the advertisement message includes an SLsB SR-Capabilities TLV such as the SLsB SR-Capabilities TLV illustrated in FIG. 9. FIG. 9 is a block diagram illustrating SLsB SR-Capabilities TLV 900 according to one embodiment. In the illustrated embodiment, SLsB SR-Capabilities TLV 900 includes type field 905, length field 910, range field 915, start index field 920, use-range flag 925, LsB SR Capabilities Sub-TLV 930, and LsB SR Capabilities Sub TLV 935. Other fields can be included, however, as part of SLsB SR-Capabilities TLV 900. Type field 905 contains a predefined encoding that identifies SLsB SR-Capabilities TLV 900. Length field 910 includes a value indicating the length of SLsB SR-Capabilities TLV 900. In one embodiment, range field 615 and start index field 920 contain the range and start index, respectively, of the SLsB being advertised by SLsB SR-Capabilities TLV 900.

In one embodiment, SLsB SR-Capabilities TLV 900 includes LsB SR Capabilities Sub-TLVs 930 and 935, which can be implemented as part of LsB SR capabilities Sub-TLV 300 illustrated in FIG. 3. In one embodiment, LsB SR Capabilities Sub-TLV 930 includes information concerning a source LsB (e.g., source LsB 701) and LsB SR Capabilities Sub-TLV 935 includes information concerning a target LsB (e.g., target LsB 702).

In one embodiment, use-range flag 925 contains a Boolean value. For example, use-range flag field 925 can include a Boolean True value (herein simply referred to as a "true use-range flag") or a Boolean False value (herein simply referred to as a "false use-range flag"). In one embodiment, when SLsB SR-Capabilities TLV 900 includes a true use-range flag, SLsB SR-Capabilities TLV 900 causes receiving LSRs to perform index to SID mapping using the range and start index of the advertised SLsB contained in range field 915 and start index field 920, respectively. In one embodiment, when SLsB SR-Capabilities TLV 900 includes a false use-range flag, SLsB SR-Capabilities TLV 900 causes receiving LSRs to perform index to SID mapping without using the range of the advertised SLsB. Instead, the receiving LSRs perform index to SID mapping using the ranges and start indexes of the source LsB and target LsB, which are contained in LsB SR Capabilities Sub-TLVs 930 and 935, respectively.

Referring now back to FIG. 8, at operation 810, the advertisement sent by network device 101 includes a false use-range flag. At operation 815, in response to the false use-range flag of operation 810, network devices 102-103 perform index to SID mapping for network device 101 without using the start index and range of the advertised SLsB. Instead, when forwarding packets to network device 101, network devices 102-103 perform index to SID mapping using the start indexes and ranges of the source LsB and target LsB as advertised in the SLsB advertisement message of operation 810.

Figure 10:
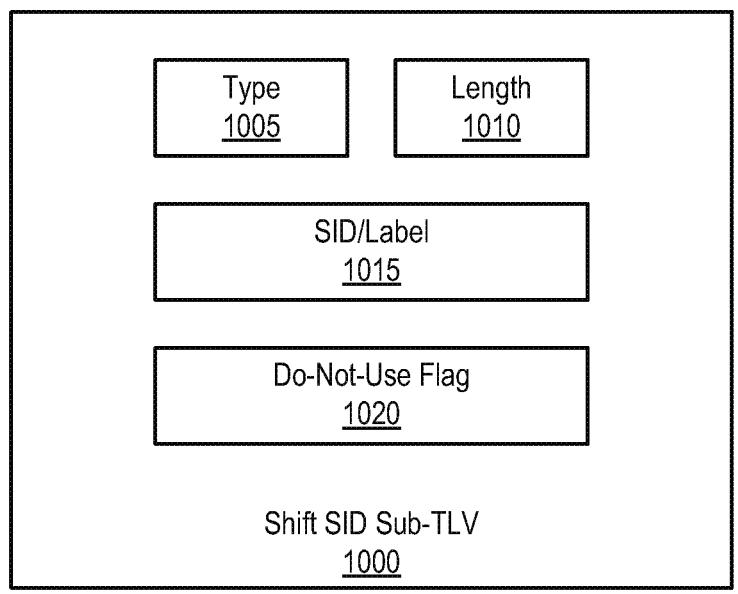
FIG. 10 is a block diagram illustrating a shift SID Sub-TLV according to one embodiment.

At operation 820, network device 101 sends an advertisement message to network devices 102-103 advertising the shift-SID for the prefix which is affected by the LsB compaction process. As described above, the "affected prefix", such as affected prefix 721, is the prefix whose SID will change as a result of the compaction process. In one embodiment, the advertisement message includes a shift SID Sub-TLV such as the shift SID Sub-TLV illustrated in FIG. 10. FIG. 10 is a block diagram illustrating shift SID Sub-TLV 1000 according to one embodiment. In the illustrated embodiment, shift SID Sub-TLV 1000 includes type field 1005, length field 1010, SID/Label field 1015, and do-not-use flag field 1020. Other fields can be included, however, as part of shift SID Sub-TLV 1000. Type field 1005 contains a predefined encoding that identifies shift SID Sub-TLV 1000. Length field 1010 includes a value indicating the length of shift SID Sub-TLV 1000. In one embodiment, SID/Label field 1015 includes the SID being advertised. For example, SID/Label field 1015 contains the "shift SID" when transmitted as part of operation 810.

Do-not-use flag field 1020 contains a Boolean value. For example, do-not-use flag field 1020 can include a Boolean True value (herein simply referred to as a "true do-no-use flag") or a Boolean False value (herein simply referred to as a "false do-not-use flag"). In one embodiment, when shift SID/Label Sub-TLV 1000 includes a true do-not-use flag, shift SID/Label Sub-TLV 1000 causes core/transit LSRs to setup their routing tables such that packets corresponding to the advertised SID (i.e., the SID contained in SID/Label 1015) can be routed/forwarded to the next hop. For example, a true do-not-use flag may cause the transit LSRs to setup a NHLFE entry for the advertised SID in their ILM maps. In one embodiment, when shift SID/Label Sub-TLV 1000 includes a true do-not-use flag, shift SID/Label Sub-TLV 1000 causes ingress LSRs to not setup their routing tables in order to prevent packets corresponding to the advertised SID from being forwarded to the SR domain. For example, a true do-not-use flag may cause the ingress LSR to not setup a NHLFE entry for the advertised SID in the FTN map. In one embodiment, if an NHLFE entry for the advertised SID already exists in the FTP map, a true do-not-use flag causes the ingress LSR to remove the existing NHLFE entry in order to prevent packets associated with the advertised SID from being introduced into the SR domain.

In one embodiment, when shift SID/Label Sub-TLV 1000 includes a false do-not-use flag, shift SID/Label Sub-TLV 1000 causes ingress LSRs to setup their routing tables in order to allow packets corresponding to the advertised SID to be introduced (i.e., forwarded) into the SR domain. For example, a false do-not-use flag may cause the ingress LSR to setup a NHLFE entry for the advertised SID in the FTN map to allow packets associated with the advertised SID to be introduced into the SR domain.

Referring now back to FIG. 8, at operation 820, the advertisement sent by network device 101 includes a true do-not-use flag. At operation 825, in response to the true do-not-use flag of operation 820, network device 102 does not setup its routing table in order to prevent packets associated with the advertised "shift SID" from being introduced into the SR network. For example, network device 102 does not setup a NHLFE entry corresponding to the advertised "shift SID" in FTP map 126. In one embodiment, if the NHLFE entry corresponding to the advertised "shift SID" already exists in FTN map 126, network device 102 removes the existing NHLFE entry. In this way, packets associated with the "shift SID" will not be forwarded to the SR domain.

At operation 830, in response to the true do-not-use flag of operation 820, network device 103 sets up its routing table in order to forward packets associated with the advertised "shift SID" to the next hop. For example, network device 103 sets up a NHLFE entry corresponding to the advertised "shift SID" in ILM 136. In this way, packets associated with the "shift SID" will be forwarded to the next hop in the SR domain. Note that by setting up the routing tables of the transit LSRs before setting up the routing tables of ingress LSR, network device 101 ensures that once packets associated with the "shift SID" are introduced into the SR domain, they will be forwarded appropriately, in a hitless manner.

In one embodiment, network device 101 waits for a predetermined duration of time after transmitting the advertisement of operation 820. For example, network device 101 waits for a duration of time in order to allow network devices 102-103 sufficient time to update their routing tables (e.g., perform operations 825 and 830, respectively). At operation 835, after waiting for the predetermined duration of time, network device 101 re-advertises the "shift SID", but this time with a false do-not-use flag. For example, network device 101 sends an advertisement message to network devices 102-103 that includes Shift SID Sub-TLV 1000 with SID/Label field 1015 containing the "shift SID", and do-not-use flag field 1020 containing a Boolean False value.

At operation 840, in response to the false do-not-use flag of operation 835, the ingress router sets up its routing table such that packets associated with the "shift SID" can be introduced to the SR domain (e.g., forwarded to the next hop in the SR domain). For example, in response to the false do-not-use flag of operation 835, network device 102 sets up a NHLFE entry corresponding to the "shift SID" in FTN map 126. In this way, packets associated with the "shift SID" can be forwarded to the SR domain (i.e., forwarded to the next hop). Again, as described above the transit LSRs have been previously setup to route these packets, and thus the re-mapping of the affected prefix to the "shift SID" is performed in a hitless manner.

In one embodiment, network device 101 waits for another predetermined duration of time after transmitting the advertisement of operation 835. For example, network device 101 waits for a duration of time in order to allow network device 102 sufficient time to update its routing table (e.g., perform operation 840). At operation 845, after waiting for the predetermined duration of time, network device 101 sends an advertisement message to network devices 102-103 advertising the "source SID" that was allocated to the affected prefix prior to the LsB compaction process. For example, network device 101 advertises source SID 712 which was allocated to affected prefix 721 prior to the LsB compaction process. In one embodiment, the advertisement message includes an SID/Label Sub-TLV such as Shift SID Sub-TLV 1000. For example, when transmitted as part of operation 845, SID/Label field 1015 contains the "source SID", and do-not-use flag field 1020 contains a Boolean True value.

At operation 850, in response to the true do-not-use flag of operation 845, network device 102 updates its routing table in order to prevent packets associated with the advertised "source SID" from being introduced into the SR network. For example, if the NHLFE entry corresponding to the advertised "source SID" exists in FTN map 126, network device 102 removes the existing NHLFE entry. In this way, packets associated with the "source SID" will not be forwarded to SR domain. Although not illustrated, it shall be understood that network device 101 stops advertising the "source SID". In response to not receiving advertisements for the "source SID", the transit LSRs update their routing tables such that routing information associated with the "source SID" are removed. For example, network device 103 removes all NHLFE entries associated with the "source SID" from ILM 136.

In one embodiment, network device 101 waits for a predetermined duration of time after transmitting the advertisement of operation 845. For example, network device 101 waits for a duration of time in order to allow network device 102 sufficient time to update its routing table (e.g., perform operation 850). At operation 855, after waiting for the predetermined duration of time, network device 101 re-advertises the shift LsB, but this time with a true use-range flag. For example, network device 101 sends an advertisement message to network devices 102-103 that includes SLsB SR Capabilities TLV 900 with use-range flag field 1025 containing a Boolean True value.

At operation 860, in response to the true use-range flag of operation 855, network devices 102-103 performs index to SID mapping for network device 101 using the start index and range of the advertised SLsB. In other words, when forwarding packets to network device 101, network devices 102-103 perform index to SID mapping using the start index and range of the SLsB as advertised in the SLsB advertisement message of operation 855.

At operation 865, network device 101 advertises the new compacted LsB (e.g., by sending the new start index and range of the compacted LsB). At operation 870, network device 101 re-advertises the shift LsB, but this time with a false use-range flag. For example, network device 101 sends an advertisement message to network devices 102-103 that includes SLsB SR Capabilities TLV 900 with use-range flag field 1025 containing a Boolean False value.

At operation 875, in response to the false use-range flag of operation 870, network devices 102-103 perform index to SID mapping for network device 101 without using the start index and range of the advertised SLsB. Instead, when forwarding packets to network device 101, network devices 102-103 perform index to SID mapping using the start indexes and ranges of the source LsB and target LsB as advertised in the SLsB advertisement message of operation 870. At operation 885, network devices send traffic to the affected prefix using the new SID (i.e., shift SID) as the label. One having ordinary skill in the art would recognize that one or more operations of method 800 can be repeated one or more times until all portions of the source LsB have been merged with the target LsB.

Figure 11:
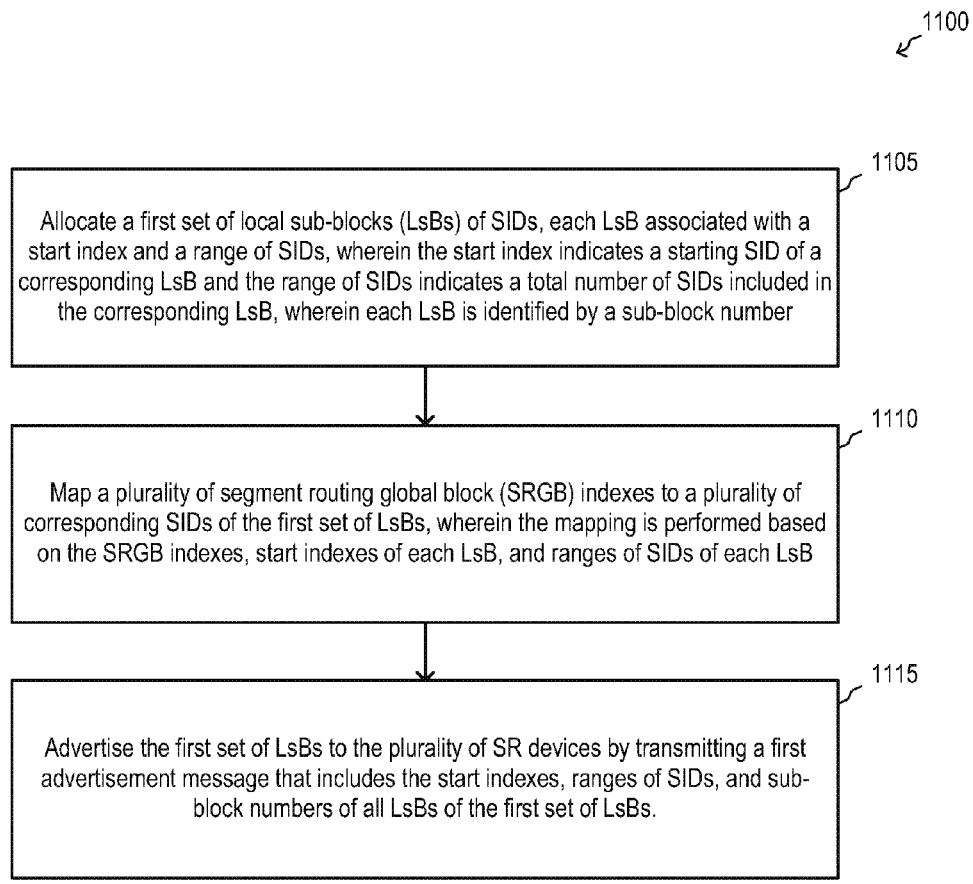
FIG. 11 is a flow diagram illustrating a method for allocating multiple LsBs at a network device according to one embodiment.

FIG. 11 is a flow diagram illustrating method 1100 for allocating multiple LsBs of SIDs by a network device, according to one embodiment. For example, method 1100 can be performed by network device 101, such as SID mapper 112 of network device 101, which can be implemented as software, firmware, hardware, or any combination thereof.

Referring now to FIG. 11, at block 1105, the network device allocates a first set of local sub-blocks (LsBs) of SIDs (e.g., LsBs 115-116), each LsB associated with a start index and a range of SIDs, wherein the start index indicates a starting SID of a corresponding LsB and the range of SIDs indicates a total number of SIDs included in the corresponding LsB, wherein each LsB is identified by a sub-block number.

At block 1110, the network device maps a plurality of segment routing global block (SRGB) indexes to a plurality of corresponding SIDs of the first set of LsBs, wherein the mapping is performed based on the SRGB indexes, start indexes of each LsB, and ranges of SIDs of each LsB. At block 1115, the network device advertises the first set of LsBs to the plurality of SR devices (e.g., network devices 102-103) by transmitting a first advertisement message that includes the start indexes, ranges of SIDs, and sub-block numbers of all LsBs of the first set of LsBs.

Figure 12:
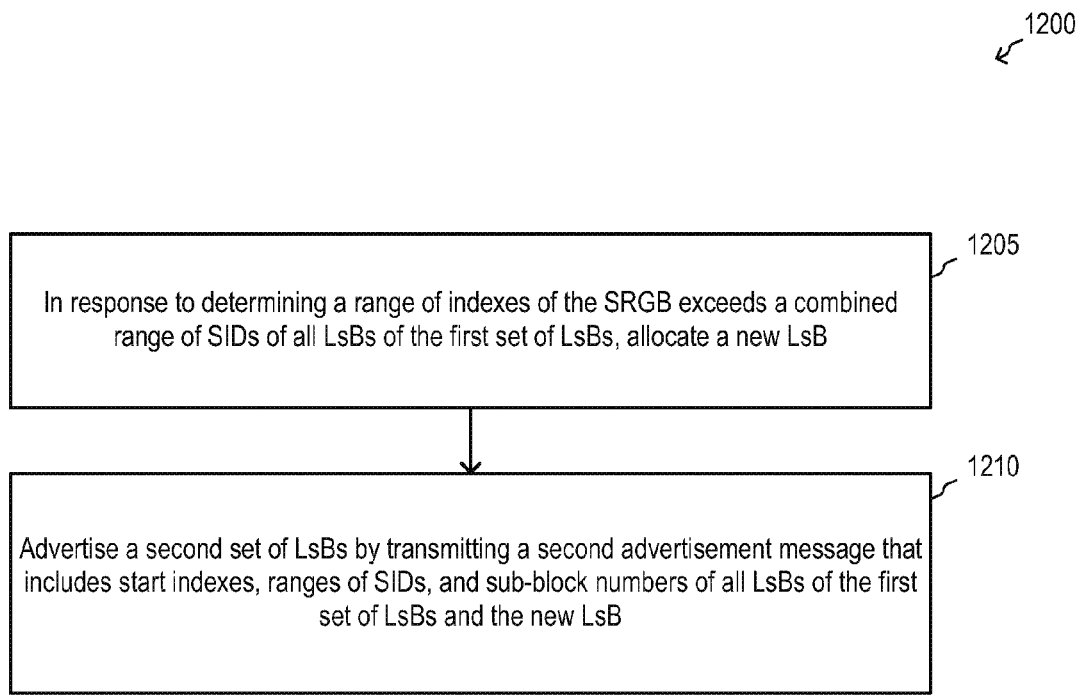
FIG. 12 is a flow diagram illustrating a method for allocating additional LsBs according to one embodiment.

FIG. 12 is a flow diagram illustrating method 1200 for allocating a new LsB by a network device, according to one embodiment. For example, method 1200 can be performed by network device 101, such as SID mapper 112 of network device 101, which can be implemented as software, firmware, hardware, or any combination thereof.

Referring now to FIG. 12, at block 1205, in response to determining a range of indexes of the SRGB exceeds a combined range of SIDs of all LsBs of the first set of LsBs (e.g., LsBs 115-116), the network device allocates a new LsB. At block 1210, the network device advertises a second set of LsBs by transmitting a second advertisement message that includes start indexes, ranges of SIDs, and sub-block numbers of all LsBs of the first set of LsBs and the new LsB.

Figure 13:
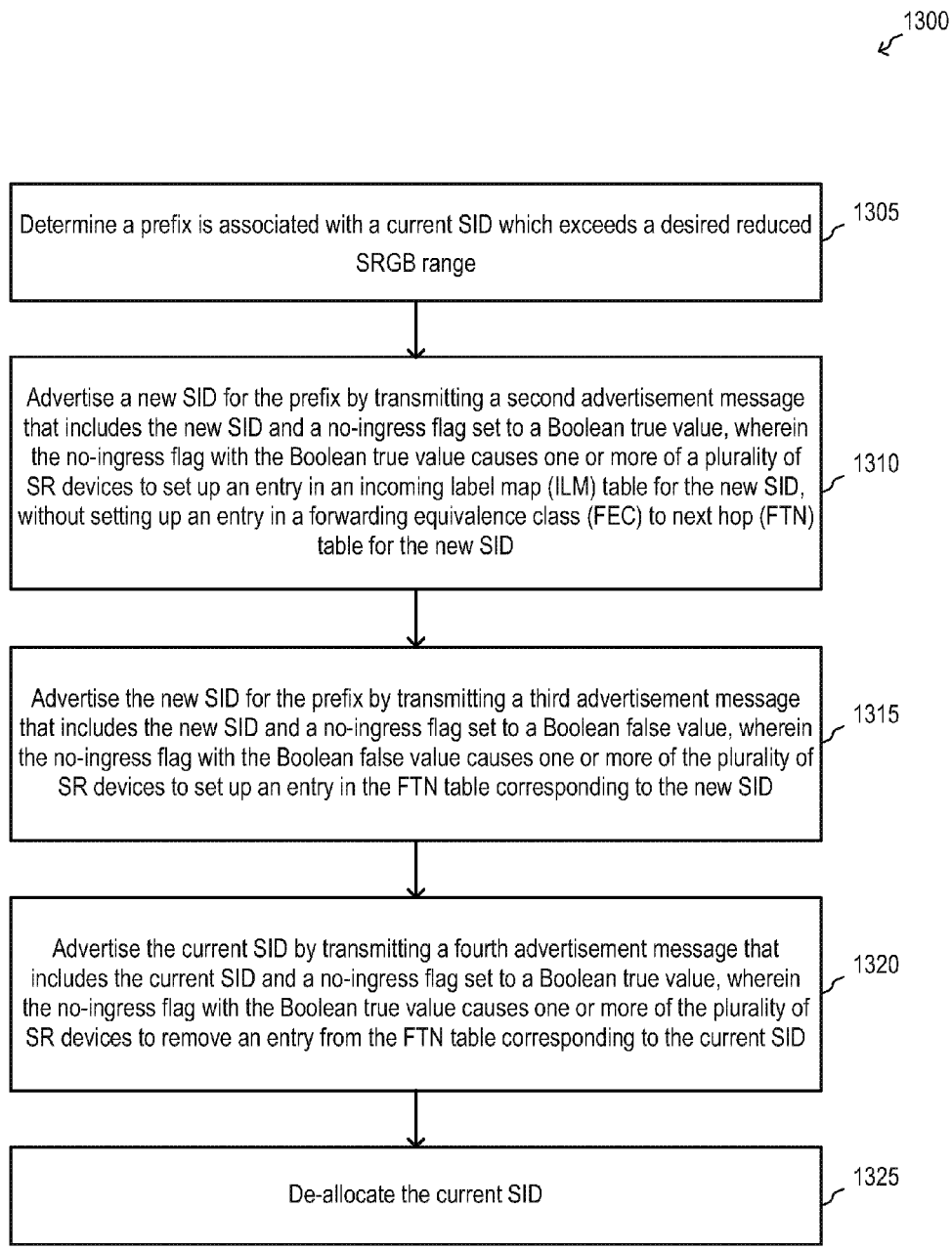
FIG. 13 is a flow diagram illustrating a method for decreasing the SRGB range according to one embodiment.

FIG. 13 is a flow diagram illustrating method 1300 for allocating a new LsB by a network device, according to one embodiment. For example, method 1300 can be performed by network device 101, such as SID mapper 112 of network device 101, which can be implemented as software, firmware, hardware, or any combination thereof.

Referring now to FIG. 13, at block 1305, the network device determines a prefix is associated with a current SID which exceeds a desired reduced SRGB range. At block 1310, the network device advertises a new SID for the prefix by transmitting a second advertisement message that includes the new SID and a no-ingress flag set to a Boolean true value (e.g., as part of operation 520), wherein the no-ingress flag with the Boolean true value causes one or more of the plurality of SR devices to set up an entry in an incoming label map (ILM) table for the new SID (e.g., as part of operation 530), without setting up an entry in a forwarding equivalence class (FEC) to next hop (FTN) table for the new SID (e.g., as part of operation 525).

At block 1315, the network device advertises the new SID for the prefix by transmitting a third advertisement message that includes the new SID and a no-ingress flag set to a Boolean false value (e.g., as part of operation 535), wherein the no-ingress flag with the Boolean false value causes one or more of the plurality of SR devices to set up an entry in the FTN table corresponding to the new SID (e.g., as part of operation 540).

At block 1320, the network device advertises the current SID by transmitting a fourth advertisement message that includes the current SID and a no-ingress flag set to a Boolean true value (e.g., as part of operation 545), wherein the no-ingress flag with the Boolean true value causes one or more of the plurality of SR devices to remove an entry from the FTN table corresponding to the current SID (e.g., as part of operation 550). At block 1325, the network device de-allocates the current SID (e.g., as part of operation 555).

Figure 14:
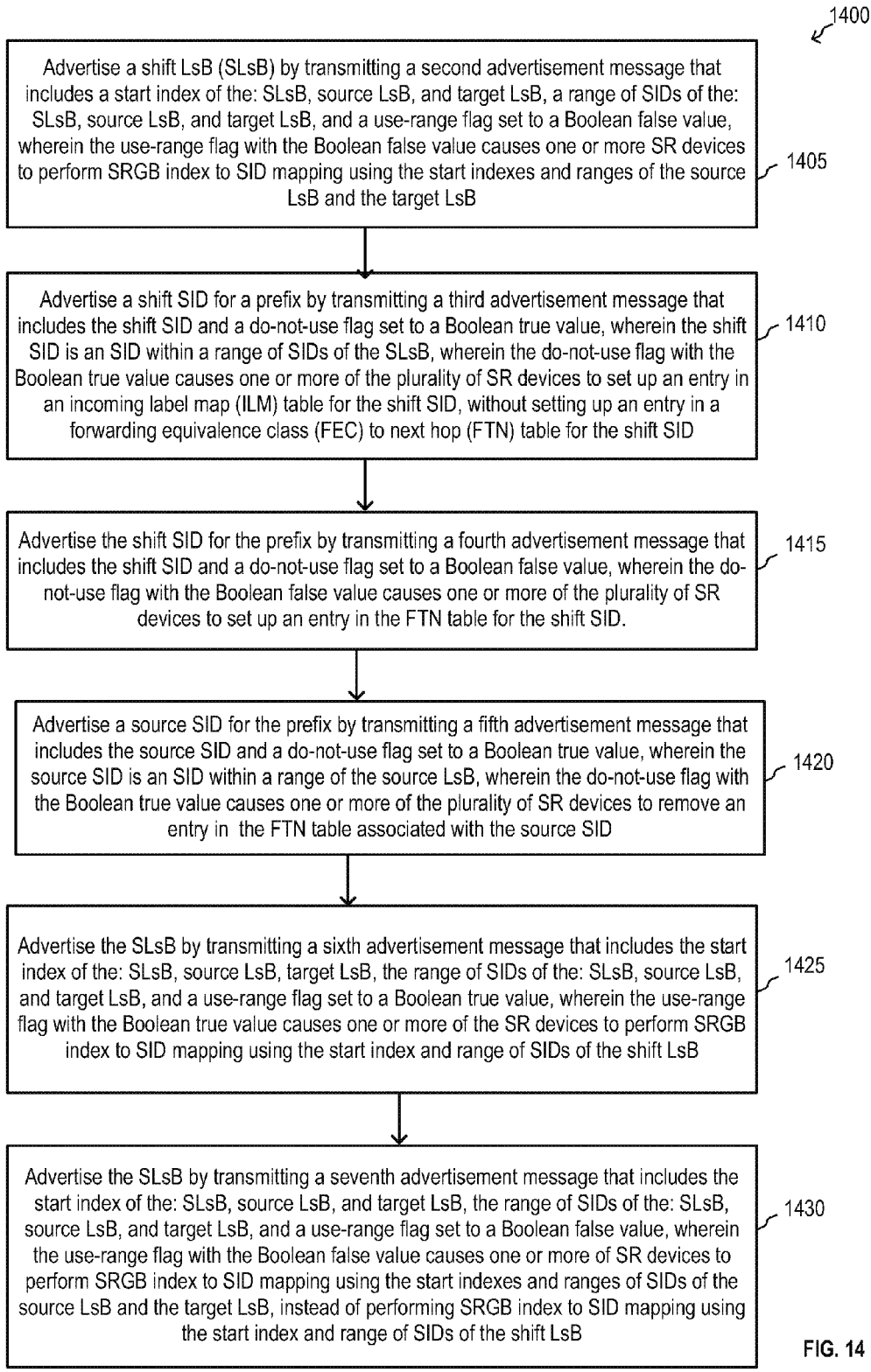
FIG. 14 is a flow diagram illustrating a method for compacting/coalescing LsBs according to one embodiment.

FIG. 14 is a flow diagram illustrating method 1400 for coalescing/compacting LsBs by a network device, according to one embodiment. For example, method 1400 can be performed by network device 101, such as SID mapper 112 of network device 101, which can be implemented as software, firmware, hardware, or any combination thereof.

Referring now to FIG. 14, at block 1400, the network device advertises a shift LsB (SLsB) by transmitting a second advertisement message (e.g., as part of operation 810) that includes a start index of the SLsB, a start index of the source LsB, a start index of the target LsB, a range of SIDs of the SLsB, a range of SIDs of the source LsB, a range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

At block 1410, the network device advertises a shift SID for a prefix by transmitting a third advertisement message that includes the shift SID and a do-not-use flag set to a Boolean true value (e.g., as part of operation 820), wherein the shift SID is an SID within a range of SIDs of the SLsB, wherein the do-not-use flag with the Boolean true value causes one or more of the plurality of SR devices to set up an entry in an incoming label map (ILM) table for the shift SID, without setting up an entry in a forwarding equivalence class (FEC) to next hop (FTN) table for the shift SID.

At block 1415, the network device advertises the shift SID for the prefix by transmitting a fourth advertisement message that includes the shift SID and a do-not-use flag set to a Boolean false value (e.g., as part of operation 835), wherein the do-not-use flag with the Boolean false value causes one or more of the plurality of SR devices to set up an entry in the FTN table for the shift SID.

At block 1420, the network device advertises a source SID for the prefix by transmitting a fifth advertisement message that includes the source SID and a do-not-use flag set to a Boolean true value (e.g., as part of operation 845), wherein the source SID is an SID within a range of the source LsB, wherein the do-not-use flag with the Boolean true value causes one or more of the plurality of SR devices to remove an entry in the FTN table associated with the source SID.

At block 1425, the network device advertises the SLsB by transmitting a sixth advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean true value (e.g., as part of operation 855), wherein the use-range flag with the Boolean true value causes one or more of the plurality of SR devices to perform SRGB index to SID mapping using the start index and range of SIDs of the shift LsB.

At block 1430, the network device advertises the SLsB by transmitting a seventh advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean false value (e.g., as part of operation 870), wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

Various embodiments of the present invention can be implemented by way of further extending the IS-IS extensions disclosed in I-D.previdi-isis-segment-routing-extensions. For example, LsB SR-Capabilities TLV 300 can be implemented similar to the SR-Capabilities TLV defined in I-D.previdi-isis-segment-routing-extensions with the addition of a 4-byte sub-block number. In such an embodiment, a net Tag value must be allocated. As described above, many of such TLVs can be advertised, each with a unique sub-block number.

In one embodiment, SID/Label Sub-TLV 600 can be implemented by way of further extending the IS-IS extensions disclosed in I-D.previdi-isis-segment-routing-extensions. For example, SID/Label Sub-TLV 600 can be implemented similar to the SID/Label Sub-TLV defined in I-D.previdi-isis-segment-routing-extensions with the addition of the no-ingress flag. In such an embodiment, the length field would be 4 bytes instead of the 3-4 bytes as currently defined in I-D.previdi-isis-segment-routing-extensions.

In one embodiment, SLsB SR-Capabilities TLV 900 can be implemented by way of further extending the IS-IS extensions disclosed in I-D.previdi-isis-segment-routing-extensions. For example, SLsB SR-Capabilities TLV 900 can be implemented similar to the LsB SR-Capabilities TLV with the addition of the use-range flag and two LsB SR-Capabilities TLVs. One of the LsB SR-Capabilities TLVs corresponds to the source LsB and the other LsB SR-Capabilities TLV corresponds to the target LsB, as described above. A new Tag value must be allocated.

In one embodiment, shift SID Sub-TLV 1000 can be implemented by way of further extending the IS-IS extensions disclosed in I-D.previdi-isis-segment-routing-extensions. For example, shift SID Sub-TLV 1000 can be implemented similar to the SID/Label Sub-TLV with the addition of the do-not-use flag. A new Tag value must be allocated.

Various embodiments of the present invention can be implemented by way of further extending the OSPF extensions disclosed in I-D.psenak-ospf-segment-routing-extensions. For example, LsB SR-Capabilities TLV 300 can be implemented similar to the SID range Sub-TLV defined in I-D.psenak-ospf-segment-routing-extensions with the addition of a 4-byte sub-block number. In such an embodiment, a net Tag value must be allocated. As described above, many of such TLVs can be advertised, each with a unique sub-block number.

In one embodiment, SID/Label Sub-TLV 600 can be implemented by way of further extending the OSPF extensions disclosed in I-D.psenak-ospf-segment-routing-extensions. For example, SID/Label Sub-TLV 600 can be implemented similar to the Prefix SID Sub-TLV defined in I-D.psenak-ospf-segment-routing-extensions with the addition of the no-ingress flag.

In one embodiment, SLsB SR-Capabilities TLV 900 can be implemented by way of further extending the OSPF extensions disclosed in I-D.psenak-ospf-segment-routing-extensions. For example, SLsB SR-Capabilities TLV 900 can be implemented similar to the LsB SID Range Sub-TLV with the addition of the use-range flag and two LsB SR-Capabilities TLVs. One of the LsB SR-Capabilities TLVs corresponds to the source LsB and the other LsB SR-Capabilities TLV corresponds to the target LsB, as described above. A new Tag value must be allocated.

In one embodiment, shift SID Sub-TLV 1000 can be implemented by way of further extending the OSPF extensions disclosed in I-D.psenak-ospf-segment-routing-extensions. For example, shift SID Sub-TLV 1000 can be implemented similar to the Prefix SID Sub-TLV with the addition of the do-not-use flag. A new Tag value must be allocated.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device that is communicatively coupled to a plurality of segment routing (SR) devices in a SR network, the method comprising:
    allocating a first set of local sub-blocks (LsBs) of segment identifiers (SIDs), each LsB associated with a start index and a range of SIDs, wherein the start index indicates a starting SID of a corresponding LsB and the range of SIDs indicates a total number of SIDs included in the corresponding LsB, wherein each LsB is identified by a sub-block number;
    mapping a plurality of segment routing global block (SRGB) indexes to a plurality of corresponding SIDs of the first set of LsBs, wherein the mapping is performed based on the SRGB indexes, start indexes of each LsB, and ranges of SIDs of each LsB;
    advertising the first set of LsBs to the plurality of SR devices by transmitting a first advertisement message that includes the start indexes, ranges of SIDs, and sub-block numbers of all LsBs of the first set of LsBs;
    determining whether an SRGB range exceeds a combined range of SIDs of all LsBs of the first set of LsBs;
    allocating a new LsB in response to a determination that the SRGB range exceeds the combined range of SIDs of all LsBs of the first set of LsBs; and
    advertising a second set of LsBs by transmitting a second advertisement message that includes start indexes, ranges of SIDs, and sub-block numbers of all LsBs of the first set of LsBs and the new LsB.

2. The method of claim 1, wherein mapping the plurality of indexes of the SRGB to the plurality of corresponding SIDs of the first set of LsBs comprises:
    determining a range of SIDs of a first LsB is less than an SRGB index;
    determining a combined range of SIDs of the first LsB and a second LsB by adding a range of SIDs of the first LsB and a range of SIDs of the second LsB; and
    in response to determining the combined range of SIDs of the first LsB and the second LsB is greater than the SRGB index:
        determining a difference by subtracting the range of the first LsB from the SRGB index,
        determining a sum by adding the difference to a start index of the second LsB, and
        mapping the SRGB index to the sum.

3. The method of claim 1, further comprising in response to determining a combined range of SIDs of all LsBs of the first set of LsBs exceeds a desired reduced SRGB range, decreasing the combined range of SIDs of the first set of LsBs by de-allocating an SID of an LsB having a highest sub-block number among all the LsBs of the first set of LsBs.

4. The method of claim 3, wherein de-allocating the SID comprises:
    determining a prefix is associated with a current SID which exceeds the desired reduced SRGB range;
    advertising a new SID for the prefix by transmitting a second advertisement message that includes the new SID and a no-ingress flag set to a Boolean true value, wherein the no-ingress flag with the Boolean true value causes one or more of the plurality of SR devices to set up an entry in an incoming label map (ILM) table for the new SID, without setting up an entry in a forwarding equivalence class (FEC) to next hop (FTN) table for the new SID;
    advertising the new SID for the prefix by transmitting a third advertisement message that includes the new SID and a no-ingress flag set to a Boolean false value, wherein the no-ingress flag with the Boolean false value causes one or more of the plurality of SR devices to set up an entry in the FTN table corresponding to the new SID;
    advertising the current SID by transmitting a fourth advertisement message that includes the current SID and a no-ingress flag set to a Boolean true value, wherein the no-ingress flag with the Boolean true value causes one or more of the plurality of SR devices to remove an entry from the FTN table corresponding to the current SID; and
    de-allocating the current SID.

5. The method of claim 1, further comprising decreasing a number of LsBs of the first set of LsBs by merging a source LsB of the first set of LsBs with a target LsB of the first set of LsBs, by:
    advertising a shift LsB (SLsB) by transmitting a second advertisement message that includes a start index of the SLsB, a start index of the source LsB, a start index of the target LsB, a range of SIDs of the SLsB, a range of SIDs of the source LsB, a range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

6. The method of claim 5, wherein decreasing the number of LsBs of the first set of LsBs further comprises:
advertising a shift SID for a prefix by transmitting a third advertisement message that includes the shift SID and a do-not-use flag set to a Boolean true value, wherein the shift SID is an SID within a range of SIDs of the SLsB, wherein the do-not-use flag with the Boolean true value causes one or more of the plurality of SR devices to set up an entry in an incoming label map (ILM) table for the shift SID, without setting up an entry in a forwarding equivalence class (FEC) to next hop (FTN) table for the shift SID; and
advertising the shift SID for the prefix by transmitting a fourth advertisement message that includes the shift SID and a do-not-use flag set to a Boolean false value, wherein the do-not-use flag with the Boolean false value causes one or more of the plurality of SR devices to set up an entry in the FTN table for the shift SID.

7. The method of claim 6, wherein decreasing the number of LsBs of the first set of LsBs further comprises:
advertising a source SID for the prefix by transmitting a fifth advertisement message that includes the source SID and a do-not-use flag set to a Boolean true value, wherein the source SID is an SID within a range of the source LsB, wherein the do-not-use flag with the Boolean true value causes one or more of the plurality of SR devices to remove an entry in the FTN table associated with the source SID; and
advertising the SLsB by transmitting a sixth advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean true value, wherein the use-range flag with the Boolean true value causes one or more of the plurality of SR devices to perform SRGB index to SID mapping using the start index and range of SIDs of the shift LsB.

8. The method of claim 7, wherein decreasing the number of LsBs of the first set of LsBs further comprises:
advertising the SLsB by transmitting a seventh advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

9. A first network device that is communicatively coupled to a plurality of segment routing (SR) devices in a SR network, the first network device comprising:
a set of one or more processors; and
a non-transitory machine-readable storage medium containing code, which when executed by the set of one or more processors, cause the first network device to:
allocate a first set of local sub-blocks (LsBs) of segment identifiers (SIDs), each LsB associated with a start index and a range of SIDs, wherein the start index indicates a starting SID of a corresponding LsB and the range of SIDs indicates a total number of SIDs included in the corresponding LsB, wherein each LsB is identified by a sub-block number,
map a plurality of segment routing global block (SRGB) indexes to a plurality of corresponding SIDs of the first set of LsBs, wherein the mapping is performed based on the SRGB indexes, start indexes of each LsB, and ranges of SIDs of each LsB,
advertise the first set of LsBs to the plurality of SR devices by transmitting a first advertisement message that includes the start indexes, ranges of SIDs, and sub-block numbers of all LsBs of the first set of LsBs,
determine whether an SRGB range exceeds a combined range of SIDs of all LsBs of the first set of LsBs,
allocate a new LsB in response to a determination that the SRGB range exceeds the combined range of SIDs of all LsBs of the first set of LsBs, and
advertise a second set of LsBs by transmitting a second advertisement message that includes start indexes, ranges of SIDs, and sub-block numbers of all LsBs of the first set of LsBs and the new LsB.

10. The first network device of claim 9, wherein mapping the plurality of indexes of the SRGB to the plurality of corresponding SIDs of the first set of LsBs comprises:
determining a range of SIDs of a first LsB is less than an SRGB index;
determining a combined range of SIDs of the first LsB and a second LsB by adding a range of SIDs of the first LsB and a range of SIDs of the second LsB; and
in response to determining the combined range of SIDs of the first LsB and the second LsB is greater than the SRGB index:
determining a difference by subtracting the range of the first LsB from the SRGB index,
determining a sum by adding the difference to a start index of the second LsB, and
mapping the SRGB index to the sum.

11. The first network device of claim 9, wherein the non-transitory machine-readable storage medium further containing code, which when executed by the set of one or more processors, cause the first network device to in response to determining a combined range of SIDs of all LsBs of the first set of LsBs exceeds a desired reduced SRGB range, decreasing the combined range of SIDs of the first set of LsBs by de-allocating an SID of an LsB having a highest sub-block number among all the LsBs of the first set of LsBs.

12. The first network device of claim 11, wherein de-allocating the SID comprises:
determining a prefix is associated with a current SID which exceeds the desired reduced SRGB range;
advertising a new SID for the prefix by transmitting a second advertisement message that includes the new SID and a no-ingress flag set to a Boolean true value, wherein the no-ingress flag with the Boolean true value causes one or more of the plurality of SR devices to set up an entry in an incoming label map (ILM) table for the new SID, without setting up an entry in a forwarding equivalence class (FEC) to next hop (FTN) table for the new SID;
advertising the new SID for the prefix by transmitting a third advertisement message that includes the new SID and a no-ingress flag set to a Boolean false value, wherein the no-ingress flag with the Boolean false value causes one or more of the plurality of SR devices to set up an entry in the FTN table corresponding to the new SID;

advertising the current SID by transmitting a fourth advertisement message that includes the current SID and a no-ingress flag set to a Boolean true value, wherein the no-ingress flag with the Boolean true value causes one or more of the plurality of SR devices to remove an entry from the FTN table corresponding to the current SID; and de-allocating the current SID.

13. The first network device of claim 9, wherein the non-transitory machine-readable storage medium further containing code, which when executed by the set of one or more processors, cause the first network device to decrease a number of LsBs of the first set of LsBs by merging a source LsB of the first set of LsBs with a target LsB of the first set of LsBs, by:

advertising a shift LsB (SLsB) by transmitting a second advertisement message that includes a start index of the SLsB, a start index of the source LsB, a start index of the target LsB, a range of SIDs of the SLsB, a range of SIDs of the source LsB, a range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

14. The first network device of claim 13, wherein decreasing the number of LsBs of the first set of LsBs further comprises:

advertising a shift SID for a prefix by transmitting a third advertisement message that includes the shift SID and a do-not-use flag set to a Boolean true value, wherein the shift SID is an SID within a range of SIDs of the SLsB, wherein the do-not-use flag with the Boolean true value causes one or more of the plurality of SR devices to set up an entry in an incoming label map (ILM) table for the shift SID, without setting up an entry in a forwarding equivalence class (FEC) to next hop (FTN) table for the shift SID; and advertising the shift SID for the prefix by transmitting a fourth advertisement message that includes the shift SID and a do-not-use flag set to a Boolean false value, wherein the do-not-use flag with the Boolean false value causes one or more of the plurality of SR devices to set up an entry in the FTN table for the shift SID.

15. The first network device of claim 14, wherein decreasing the number of LsBs of the first set of LsBs further comprises:

advertising a source SID for the prefix by transmitting a fifth advertisement message that includes the source SID and a do-not-use flag set to a Boolean true value, wherein the source SID is an SID within a range of the source LsB, wherein the do-not-use flag with the Boolean true value causes one or more of the plurality of SR devices to remove an entry in the FTN table associated with the source SID; and advertising the SLsB by transmitting a sixth advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean true value, wherein the use-range flag with the Boolean true value causes one or more of the plurality of SR devices to perform SRGB index to SID mapping using the start index and range of SIDs of the shift LsB.

16. The first network device of claim 15, wherein decreasing the number of LsBs of the first set of LsBs further comprises:

advertising the SLsB by transmitting a seventh advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

17. A non-transitory computer-readable storage medium having computer code stored therein, which when executed by a processor of a first network device that is communicatively coupled to a plurality of segment routing (SR) devices in a SR network, cause the first network device to perform operations comprising:

allocating a first set of local sub-blocks (LsBs) of segment identifiers (SIDs), each LsB associated with a start index and a range of SIDs, wherein the start index indicates a starting SID of a corresponding LsB and the range of SIDs indicates a total number of SIDs included in the corresponding LsB, wherein each LsB is identified by a sub-block number;

mapping a plurality of segment routing global block (SRGB) indexes to a plurality of corresponding SIDs of the first set of LsBs, wherein the mapping is performed based on the SRGB indexes, start indexes of each LsB, and ranges of SIDs of each LsB;

advertising the first set of LsBs to the plurality of SR devices by transmitting a first advertisement message that includes the start indexes, ranges of SIDs, and sub-block numbers of all LsBs of the first set of LsBs;

determining whether an SRGB range exceeds a combined range of SIDs of all LsBs of the first set of LsBs;

allocating a new LsB in response to a determination that the SRGB range exceeds the combined range of SIDs of all LsBs of the first set of LsBs; and advertising a second set of LsBs by transmitting a second advertisement message that includes start indexes, ranges of SIDs, and sub-block numbers of all LsBs of the first set of LsBs and the new LsB.

18. The non-transitory computer-readable storage medium of claim 17, wherein mapping the plurality of indexes of the SRGB to the plurality of corresponding SIDs of the first set of LsBs comprises:

determining a range of SIDs of a first LsB is less than an SRGB index;

determining a combined range of SIDs of the first LsB and a second LsB by adding a range of SIDs of the first LsB and a range of SIDs of the second LsB; and in response to determining the combined range of SIDs of the first LsB and the second LsB is greater than the SRGB index:

determining a difference by subtracting the range of the first LsB from the SRGB index, determining a sum by adding the difference to a start index of the second LsB, and mapping the SRGB index to the sum.

19. The non-transitory computer-readable storage medium of claim 17, further comprising in response to determining a combined range of SIDs of all LsBs of the first set of LsBs exceeds a desired reduced SRGB range, decreasing the combined range of SIDs of the first set of LsBs by de-allocating an SID of an LsB having a highest sub-block number among all the LsBs of the first set of LsBs.

20. The non-transitory computer-readable storage medium of claim 19, wherein de-allocating the SID comprises:
determining a prefix is associated with a current SID which exceeds the desired reduced SRGB range;
advertising a new SID for the prefix by transmitting a second advertisement message that includes the new SID and a no-ingress flag set to a Boolean true value, wherein the no-ingress flag with the Boolean true value causes one or more of the plurality of SR devices to set up an entry in an incoming label map (ILM) table for the new SID, without setting up an entry in a forwarding equivalence class (FEC) to next hop (FTN) table for the new SID;
advertising the new SID for the prefix by transmitting a third advertisement message that includes the new SID and a no-ingress flag set to a Boolean false value, wherein the no-ingress flag with the Boolean false value causes one or more of the plurality of SR devices to set up an entry in the FTN table corresponding to the new SID;
advertising the current SID by transmitting a fourth advertisement message that includes the current SID and a no-ingress flag set to a Boolean true value, wherein the no-ingress flag with the Boolean true value causes one or more of the plurality of SR devices to remove an entry from the FTN table corresponding to the current SID; and
de-allocating the current SID.

21. The non-transitory computer-readable storage medium of claim 17, further comprising decreasing a number of LsBs of the first set of LsBs by merging a source LsB of the first set of LsBs with a target LsB of the first set of LsBs, by:
advertising a shift LsB (SLsB) by transmitting a second advertisement message that includes a start index of the SLsB, a start index of the source LsB, a start index of the target LsB, a range of SIDs of the SLsB, a range of SIDs of the source LsB, a range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

22. The non-transitory computer-readable storage medium of claim 21, wherein decreasing the number of LsBs of the first set of LsBs further comprises:
advertising a shift SID for a prefix by transmitting a third advertisement message that includes the shift SID and a do-not-use flag set to a Boolean true value, wherein the shift SID is an SID within a range of SIDs of the SLsB, wherein the do-not-use flag with the Boolean true value causes one or more of the plurality of SR devices to set up an entry in an incoming label map (ILM) table for the shift SID, without setting up an entry in a forwarding equivalence class (FEC) to next hop (FTN) table for the shift SID; and
advertising the shift SID for the prefix by transmitting a fourth advertisement message that includes the shift SID and a do-not-use flag set to a Boolean false value, wherein the do-not-use flag with the Boolean false value causes one or more of the plurality of SR devices to set up an entry in the FTN table for the shift SID.

23. The non-transitory computer-readable storage medium of claim 22, wherein decreasing the number of LsBs of the first set of LsBs further comprises:
advertising a source SID for the prefix by transmitting a fifth advertisement message that includes the source SID and a do-not-use flag set to a Boolean true value, wherein the source SID is an SID within a range of the source LsB, wherein the do-not-use flag with the Boolean true value causes one or more of the plurality of SR devices to remove an entry in the FTN table associated with the source SID; and
advertising the SLsB by transmitting a sixth advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean true value, wherein the use-range flag with the Boolean true value causes one or more of the plurality of SR devices to perform SRGB index to SID mapping using the start index and range of SIDs of the shift LsB.

24. The non-transitory computer-readable storage medium of claim 23, wherein decreasing the number of LsBs of the first set of LsBs further comprises:
advertising the SLsB by transmitting a seventh advertisement message that includes the start index of the SLsB, the start index of the source LsB, the start index of the target LsB, the range of SIDs of the SLsB, the range of SIDs of the source LsB, the range of SIDs of the target LsB, and a use-range flag set to a Boolean false value, wherein the use-range flag with the Boolean false value causes one or more of the plurality of SR devices to perform SRGB index to SID mapping using the start indexes of the source LsB and the target LsB, and the ranges of SIDs of the source LsB and the target LsB, instead of performing SRGB index to SID mapping using the start index and range of SIDs of the shift LsB.

* * * * *